(12) United States Patent
Liu

(10) Patent No.: US 10,853,892 B2
(45) Date of Patent: Dec. 1, 2020

(54) SOCIAL NETWORKING RELATIONSHIPS PROCESSING METHOD, SYSTEM, AND STORAGE MEDIUM

(71) Applicant: TENCENT TECHNOLOGY (SHENZHEN) COMPANY LIMITED, Shenzhen (CN)

(72) Inventor: Gang Liu, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 337 days.

(21) Appl. No.: 15/798,809

(22) Filed: Oct. 31, 2017

(65) Prior Publication Data

US 2018/0060974 A1    Mar. 1, 2018

Related U.S. Application Data

(63) Continuation of application No. PCT/CN2016/083194, filed on May 24, 2016.

(30) Foreign Application Priority Data

Sep. 9, 2015    (CN) .......................... 2015 1 0572404

(51) Int. Cl.
  *G06Q 50/00*    (2012.01)
  *G06F 16/22*    (2019.01)
  (Continued)

(52) U.S. Cl.
  CPC ......... *G06Q 50/01* (2013.01); *G06F 16/2228* (2019.01); *G06F 16/9535* (2019.01);
  (Continued)

(58) Field of Classification Search
  USPC ................................................ 705/319, 302
  See application file for complete search history.

(56) References Cited

U.S. PATENT DOCUMENTS 6,883,131 B2 * 4/2005 Acton .................... G11B 20/18
  714/755
8,333,659 B2 * 12/2012 Driemeyer .............. A63F 13/12
  463/29

(Continued)

FOREIGN PATENT DOCUMENTS

CN    102947854 A    2/2013
CN    104468318 A    3/2015
(Continued)

OTHER PUBLICATIONS

Liao, Xiaojing "S-MATCH: Verifiable Privacy-Preserving Profile Matching for Mobile Social Services", Published in 2014 44th Annual IEEE/IFIP International Conference on Dependable Systems and Networks (pp. 287-298) (Year: 2014).*

(Continued)

*Primary Examiner* — Sangeeta Bahl
*Assistant Examiner* — Rebecca R Novak
(74) *Attorney, Agent, or Firm* — Anova Law Group, PLLC

(57) ABSTRACT

A social networking relationships processing method includes: accessing a first forward-relationships set corresponding to a user identification of a first user in multiple data centers; obtaining an inverted-reverse-relationships set corresponding to the user identification of the first user; determining whether a difference between the first forward-relationships set of the first user and the inverted-reverse-relationship set corresponding to the user identification exists; in response to determining that the difference between the forward-relationships set and the inverted-reverse-relationships set exits, identifying a second user that causes the difference; respectively accessing first relationship information of the first user and second relationship information of the second user stored in associated data centers; and updating at least one of the first forward- (Continued)

relationships set of the first user or a second reverse-relationships set of the second user according to the relationship information of the first user and the second user from the associated data centers.

18 Claims, 8 Drawing Sheets

(51) Int. Cl.
  *G06F 16/9535* (2019.01)
  *H04L 29/14* (2006.01)
  *H04L 12/58* (2006.01)
  *H04L 29/08* (2006.01)

(52) U.S. Cl.
  CPC ............ *H04L 51/14* (2013.01); *H04L 67/306* (2013.01); *H04L 69/40* (2013.01); *H04L 51/32* (2013.01); *H04L 67/1065* (2013.01); *H04L 67/1095* (2013.01); *H04L 67/28* (2013.01)

(56) References Cited

U.S. PATENT DOCUMENTS

| | | | | |
|---|---|---|---|---|
| 8,566,396 B2* | 10/2013 | Mo | .................. | H04L 51/32 |
| | | | | 709/204 |
| 8,959,390 B2* | 2/2015 | Kuang | ................ | G06F 11/1076 |
| | | | | 714/6.24 |
| 9,477,994 B2* | 10/2016 | Lin | .................... | H04L 67/1044 |
| 9,626,656 B2* | 4/2017 | Yao | ...................... | H04M 1/575 |
| 2013/0179679 A1* | 7/2013 | Broustis | ................ | H04L 9/0822 |
| | | | | 713/152 |

FOREIGN PATENT DOCUMENTS

| | | |
|---|---|---|
| EP | 1594070 A2 | 11/2005 |
| JP | 2000285061 A | 10/2000 |
| JP | 2011523475 A | 8/2011 |
| JP | 2012242859 A | 12/2012 |
| JP | 2013250977 A | 12/2013 |
| JP | 2014232483 A | 12/2014 |
| KR | 20130026612 A | 3/2013 |
| TW | 200939048 A | 9/2009 |

OTHER PUBLICATIONS

European Patent Office (EPO) European search report for 16843461.1 dated Jun. 25, 2018 10 pages.
The Japan Patent Office (JPO) Office Action for Application No. 2017-565255 dated Jan. 4, 2019 9 Pages (including translation).
Avinash Lakshman et al, "Cassandra", Operating Systems Review, ACM, New York, NY, US, vol. 44, No. 2, Apr. 14, 2010 (Apr. 14, 2010), pp. 35-40, XP058297963, ISSN: 0163-5980, DOI: 10.1145/1773912.1773922 6 pages.
Korean Intellectual Property Office (KIPO) Notification of Reason for Refusal for 10-2017-7035497 dated Mar. 26, 2019 7 Pages (including translation).
The World Intellectual Property Organization (WIPO) International Search Report for PCT/CN2016/083194 dated Aug. 17, 2016 5 Pages (includeing translation).

* cited by examiner

SOCIAL NETWORKING RELATIONSHIPS PROCESSING METHOD, SYSTEM, AND STORAGE MEDIUM

RELATED APPLICATION

This application is a continuation application of PCT Patent Application No. PCT/CN2016/083194, filed on May 24, 2016, which claims priority to Chinese Patent Application No. 201510572404.2, entitled "RELATION CHAIN PROCESSING SYSTEM, METHOD, AND APPARATUS" filed on Sep. 9, 2015, which is incorporated by reference in its entirety.

FIELD OF THE TECHNOLOGY

The present disclosure relates to the field of social networking technologies and, in particular, to a social networking relationships processing method and system, and a storage medium.

BACKGROUND OF THE DISCLOSURE

With the development and progress of terminal hardware technologies and the popularity of networks, users can log in to a social application client by using a terminal such as a personal computer or a mobile phone, and perform social interactions with other users who log in to the social application client. The social interactions include instant messaging, content sharing, and the like.

A relation chain is a basis for users to perform social networking, and may be generally represented by a mapping relationship between user identifiers. For example, a mapping relationship between a user A and a user B may be stored, and the user A and the user B can pull the mapping relationship to obtain information of each other, and perform social interaction with each other.

Currently, to avoid failures of social interaction based on relation chains due to errors of the relation chains, the relation chains need to be stored in a centralized manner, for example, in an Internet data center (IDC). However, there exists a large crash risk for storing relation chains in a centralized manner; users cannot perform close-by access; and access performance cannot be ensured.

SUMMARY

According to various embodiments of this application, a social networking relationships processing method and system, and a storage medium are provided.

The social networking relationships processing method includes: accessing a first forward-relationships set corresponding to a user identification of a first user in multiple data centers, wherein relationship information of each user in a social network includes a forward-relationships set and a reverse-relationships set, the forward-relationships set including identifications of users added by the corresponding user as contacts, and the reverse-relationships set including identifications of users that added the corresponding user as a contact; obtaining an inverted-reverse-relationships set corresponding to the user identification of the first user, wherein the inverted-reverse-relationships set includes identifications of users whose reverse-relationships sets contain the user identification of the first user; determining whether a difference between the first forward-relationships set of the first user and the inverted-reverse-relationship set corresponding to the user identification exists; in response to determining that the difference between the forward-relationships set and the inverted-reverse-relationships set exits, identifying a second user that causes the difference; respectively accessing first relationship information of the first user and second relationship information of the second user stored in associated data centers; and updating at least one of the first forward-relationships set of the first user or a second reverse-relationships set of the second user according to the relationship information of the first user and the second user from the associated data centers.

The social networking relationships processing system includes multiple Internet data centers and a relation chain repair server. The multiple Internet data centers are separately configured to store relationship information corresponding to each of a plurality of user identifications, wherein the relationship information of each user in a social network includes a forward-relationships set and a reverse-relationships set, the forward-relationships set including identifications of users added by the corresponding user as contacts, and the reverse-relationships set including identifications of users that added the corresponding user as a contact; access a first forward-relationships set corresponding to a user identification of a first user; and obtain an inverted-reverse-relationships set corresponding to the user identification of the first user, wherein the inverted-reverse-relationships set includes identifications of users whose reverse-relationships sets contain the user identification of the first user. The relation chain repair server is configured to determine whether a difference between the first forward-relationships set of the first user and the inverted-reverse-relationship set corresponding to the user identification exists; in response to determining that the difference between the forward-relationships set and the inverted-reverse-relationships set exits, identify a second user that causes the difference; respectively access first relationship information of the first user and second relationship information of the second user stored in associated data centers; and update at least one of the first forward-relationships set of the first user or a second reverse-relationships set of the second user according to the relationship information of the first user and the second user from the associated data centers.

A non-transitory computer-readable storage medium contains computer-executable instructions for, when executed by one or more processors, performing a social networking relationships processing method. The method includes: accessing a first forward-relationships set corresponding to a user identification of a first user in multiple data centers, wherein relationship information of each user in a social network includes a forward-relationships set and a reverse-relationships set, the forward-relationships set including identifications of users added by the corresponding user as contacts, and the reverse-relationships set including identifications of users that added the corresponding user as a contact; obtaining an inverted-reverse-relationships set corresponding to the user identification of the first user, wherein the inverted-reverse-relationships set includes identifications of users whose reverse-relationships sets contain the user identification of the first user; determining whether a difference between the first forward-relationships set of the first user and the inverted-reverse-relationship set corresponding to the user identification exists; in response to determining that the difference between the forward-relationships set and the inverted-reverse-relationships set exits, identifying a second user that causes the difference; respectively accessing first relationship information of the first user and second relationship information of the second user stored in associated data centers; and updating at least one of the first forward-relationships set of the first user or a second reverse-relationships set of the second user according to the relationship information of the first user and the second user from the associated data centers.

Details of one or more embodiments of the present disclosure are provided in the following accompanying drawings and descriptions. Other features, objectives, and advantages of the present disclosure become more obvious from the specification, accompanying drawings, and claims.

BRIEF DESCRIPTION OF THE DRAWINGS

To describe the technical solutions of the embodiments of the present invention or the existing technology more clearly, the following briefly introduces the accompanying drawings required for describing the embodiments or the existing technology. Apparently, the accompanying drawings in the following description show only some embodiments of the present invention, and a person of ordinary skill in the art may derive other drawings from these accompanying drawings without creative efforts.

DESCRIPTION OF EMBODIMENTS

To make the objectives, technical solutions, and advantages of the present disclosure clearer, the following further describes the present disclosure in detail with reference to the accompanying drawings and embodiments. It should be understood that, specific embodiments described herein are only used for explaining the present disclosure, but not used for limiting the present disclosure.

Figure 1:
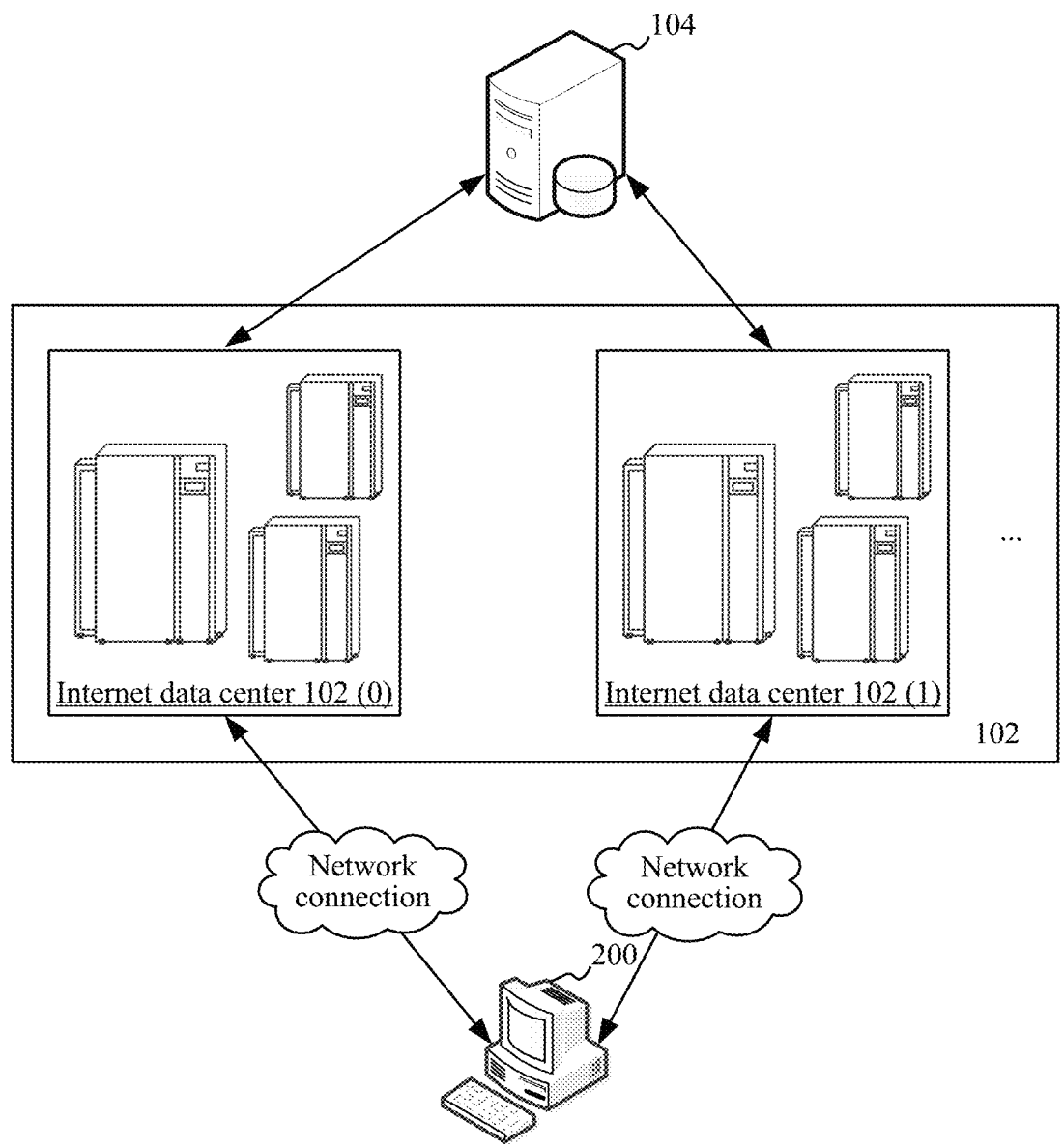
FIG. 1 is a diagram of an application environment of a social networking relationships processing system in an embodiment.

As shown in FIG. 1, in an embodiment, a social networking relationships processing system is provided and includes multiple Internet data centers 102 (including 102(1) and 102(2) in FIG. 1) and a relation chain repair server 104. Social network relationships processing, as used herein, may also be referred as relation chain processing. The relation chain repair server 104 is connected to each Internet data center 102, and the Internet data center 102 provides an access interface for a user terminal 200. The user terminal 200 may select any Internet data center 102 for access, and may generally perform close-by access to the Internet data center 102 according to a network structure. The user terminal 200 may be a desktop computer or a mobile terminal, and the mobile terminal includes at least one of a mobile phone, a tablet computer, a smart watch, and a personal digital assistant (PDA).

The multiple Internet data centers 102 are separately configured to store a forward-relationships set and a reverse-relationships set corresponding to a user identifier, where the forward-relationships set includes user identifiers of social friends added by the corresponding user identifier; and the reverse-relationships set includes user identifiers that add the user identifier corresponding to the reverse-relationships set as a social friend. In other words, relationship information of each user in a social network includes a forward-relationships set and a reverse-relationships set, the forward-relationships set including identifications of users added by the corresponding user as contacts, and the reverse-relationships set including identifications of users that added the corresponding user as a contact. The forward-relationships set, as used herein, may also be referred as positive-relation-chain user-set. The reverse-relationships set, as used herein, may also be referred as reverse-relation-chain user-set.

Specifically, the Internet data center 102 is a server cluster, and is a facility that is based on the Internet and provides running maintenance for devices that collect, store, process, and transmit data in a centralized manner. The number of the multiple Internet data centers 102 is known. A server cluster in one Internet data center 102 is centralized geographically. The social friends refer to friends based on a social network, and the friends are not limited to offline friends, and may also be users in various acquaintance relationships, such as colleagues, relatives, or lovers. A relation chain is a mapping relationship among social friends in a social network.

A positive relation chain is a relation chain in which a user actively adds another user as a friend, a forward-relationships set is a set of friends added by the user, a user identifier uniquely corresponding to the forward-relationships set is a unique identifier of the user who actively adds a friend, and the user identifiers included in the forward-relationships set are unique identifiers of friends actively added by the user. The forward-relationships set may be stored in a database table, and may be referred to as a positive direction table. Positive relation or positive direction, as used herein, may be referred as forward relationships or forward direction.

A reverse relation chain is a relation chain in which a user is passively added as a friend by another user, a user identifier uniquely corresponding to a reverse-relationships set is a unique identifier of a user passively added as a friend by another user, and the user identifiers included in the reverse-relationships set are unique identifiers of users who add the user identifier corresponding to the reverse-relationships set as a friend. The reverse-relationships set may be stored in a database table, and may be referred to as a reverse direction table. The forward-relationships set, the reverse-relationships set, and a correspondence between user identifiers corresponding to the forward-relationships set and the reverse-relationships set may be collectively referred to as relation chain data. Further, relationship information of a user includes the relation chain data.

The forward-relationships set and the reverse-relationships set corresponding to the user identifier are stored in one Internet data center 102, and another Internet data center 102 of the multiple Internet data centers 102 stores copies of the forward-relationships set and the reverse-relationships set.

For example, assuming that a user UserA and a user UserB are friends of each other and have no other friend, a forward-relationships set corresponding to the UserA is {UserB}, a reverse-relationships set corresponding to the UserA is {UserB}, and the forward-relationships set and the reverse-relationships set corresponding to the User A are stored in an Internet data center to which the UserA belongs. A forward-relationships set corresponding to the UserB is {UserA}, a reverse-relationships set corresponding to the UserB is {UserA}, and the forward-relationships set and the reverse-relationships set corresponding to the UserB are stored in an Internet data center to which the UserB belongs.

As time passes, the relation chain between the UserA and the UserB may change. For example, if the UserB first deletes the friend UserA, the forward-relationships set corresponding to the UserA is still {UserB}, the reverse-relationships set corresponding to the UserA changes to { }; while the forward-relationships set corresponding to the UserB changes to 0, and the reverse-relationships set corresponding to the UserB is still {UserA}.

Further, when the user UserB deletes the UserA, data in the user sets of the two users need to be operated on, that is, to delete the UserA in the forward-relationships set corresponding to the UserB in one Internet data center, and to delete the UserB in the reverse-relationships set corresponding to the UserA in another Internet data center. Thus, to operate on these two user sets simultaneously, modifications need to be performed across Internet data centers. In this case, if during one modification, one user set is modified successfully, and the other user set fails to be modified, relation chains between the Internet data centers 102 are inconsistent, so that the relation chain repair server 104 is needed to maintain the consistency of the relation chains between the multiple Internet data centers 102.

The relation chain repair server 104 is configured to detect whether a forward-relationships set corresponding to a currently-detected user identifier and stored in each Internet data center 102 is consistent with a corresponding inverted-reverse-relationships set. If the forward-relationships set corresponding to the currently-detected user identifier is not consistent with the corresponding inverted-reverse-relationships set, the relation chain repair server 104 performs consistency repair on the inconsistent forward-relationships set and/or the corresponding inverted-reverse-relationships set. The inverted-reverse-relationships set is formed by the user identifiers corresponding to all reverse-relationships sets that include the currently-detected user identifier. In other words, the inverted-reverse-relationships set corresponding to a first user includes identifications of users whose reverse-relationships sets contain the user identification of the first user. The inverted-reverse-relationships set, as used herein, may also be referred as reversed reverse-relation-chain user-set.

Specifically, the relation chain repair server 104 is configured to detect whether a user relation chain stored in each Internet data center 102 has any inconsistency, and perform consistency repair on the corresponding forward-relationships set and/or reverse-relationships set if the relation chain inconsistency exists. The consistency repair herein is repairing the inconsistent forward-relationships set and the corresponding reverse-relationships set to be consistent, and maintaining the consistency cross the multiple Internet data centers 102. The currently-detected user identifier is a user identifier of a user currently under inconsistency detection as to whether the user's relation chain is inconsistency.

The inverted-reverse-relationships set is formed by all user identifiers corresponding to the reverse-relationships sets that include the currently-detected user identifier as the user adding the respective user identifiers. In this way, in a normal situation, the forward-relationships set corresponding to the currently-detected user identifier is consistent with (e.g., the same as) the corresponding reverse-relationships set. If the forward-relationships set is consistent with the corresponding reverse-relationships set, no repair is performed. If the forward-relationships set corresponding to the currently-detected user identifier is not consistent with the corresponding inverted-reverse-relationships set, it indicates that at least one of the forward-relationships set corresponding to the currently-detected user identifier and the reverse-relationships set has a problem, and consistency repair needs to be performed.

For example, it is assumed that a forward-relationships set corresponding to a currently-detected user identifier U in an Internet data center is represented as f(U):{A, B, C}. From the same Internet data center, other reverse-relationships sets corresponding to other user identifiers and including the currently-detected user identifier U are: r(A):{ . . . , U, . . . }, r(B):{ . . . , U, . . . }, and r(C):{ . . . , U, . . . }, i.e., reverse-relationships sets respectively corresponding to user identifiers A, B, and C. Thus, the inverted-reverse-relationships set includes other user identifiers corresponding to other reverse-relationships sets that include the currently-detected user identifier U include the user identifiers A, B, and C, as rr(U):{A, B, C}, or the inverted-reverse-relationships set corresponding to the currently-detected user identifier. Thus, in a normal situation, f(U)=rr(U). If any relation chain of the currently-detected user identifier is inconsistent, then f(U)≠rr(U) exists.

Further, the relation chain repair server 104 may be configured to pull the forward-relationships set corresponding to the currently-detected user identifier and the corresponding inverted-reverse-relationships set in each Internet data center 102 to the relation chain repair server 104, and to further determine whether the forward-relationships set is consistent with the corresponding inverted-reverse-relationships set.

When consistency repair is performed on the inconsistent forward-relationships set and/or any corresponding reverse-relationships set, the inconsistent forward-relationships set may be repaired to be consistent with the corresponding reverse-relationships set; or the reverse-relationships set may be repaired so that the corresponding reverse-relationships set is consistent with the forward-relationships set; or the corresponding forward-relationships set and reverse-relationships set may be modified simultaneously, so that the modified forward-relationships set is consistent with the corresponding inverted-reverse-relationships set.

In an embodiment, when the relation chain repair server 104 performs consistency repair on the inconsistent forward-relationships set and/or the corresponding reverse-relationships set, if the inconsistency is due to a missing user identifier, the missing user identifier may be specifically added in the forward-relationships set or in the corresponding reverse-relationships set. In this way, when consistency repair is performed, the relation chain can be remained as much as possible, to prevent missing of a user relation chain due to system risks.

For example, assuming that f(U):{A, B, C}, rr(U):{A, B}, and in this case, f(U)≠rr(U), a user identifier U may be preferably added in a reverse-relationships set corresponding to a user identifier C, so that a relation chain between the user identifier U and the user identifier C can be maintained. Certainly, the user identifier C may also be deleted in a forward-relationships set corresponding to the user identifier U, such that a forward-relationships set and the corresponding reverse-relationships set may be made consistent, but this may cause missing of the relation chain between the user identifier U and the user identifier C.

In an embodiment, before performing consistency repair on the inconsistent forward-relationships set and/or the corresponding reverse-relationships set, the relation chain repair server 104 may send a consistency-repair-format selection request to at least one party of a relation chain pair that has a consistency problem; and after receiving a consistency-repair-format confirmation instruction fed back in response to the consistency-repair-format selection request, performs consistency repair on the inconsistent forward-relationships set and/or the corresponding reverse-relationships set according to the consistency-repair-format confirmation instruction.

For example, assuming that f(U):{A, B, C}, rr(U):{A, B}, and in this case, f(U)≠rr(U), the relation chain repair server 104 may send a consistency-repair-format selection request to a terminal corresponding to the user identifier U and/or C, so that the corresponding terminal provides an interface to receive a user input to determine a consistency-repair-format, and further returns, to the relation chain repair server 104, a consistency-repair-format confirmation instruction that indicates which consistency-repair-format is used. The repair format herein includes deleting the inconsistent relation chain and improving the inconsistent relation chain. In this way, the relation chain repair server 104 may add, according to the consistency-repair-format confirmation instruction, the user identifier U in the reverse-relationships set corresponding to the user identifier C, or delete the user identifier C in the forward-relationships set corresponding to the user identifier U.

In the relation chain processing system, a relation chain is stored in multiple Internet data centers, so that the availability of the relation chain can still be guaranteed even if one Internet data center is faulty. The relation chain is stored in each Internet data center in forms of a forward-relationships set and a reverse-relationships set, and it may be determined which friends that a user adds and which other users add the user as a friend, so that a bidirectional relation chain between users may be determined, so as to perform more precise social interaction according to the relation chain. By detecting whether a forward-relationships set of a user is consistent with a inverted-reverse-relationships set, whether a relation chain stored in each Internet data center is inconsistent can be detected, so as to ensure the consistency and the availability of the relation chain by repairing the forward-relationships set and/or the reverse-relationships set.

Figure 2:
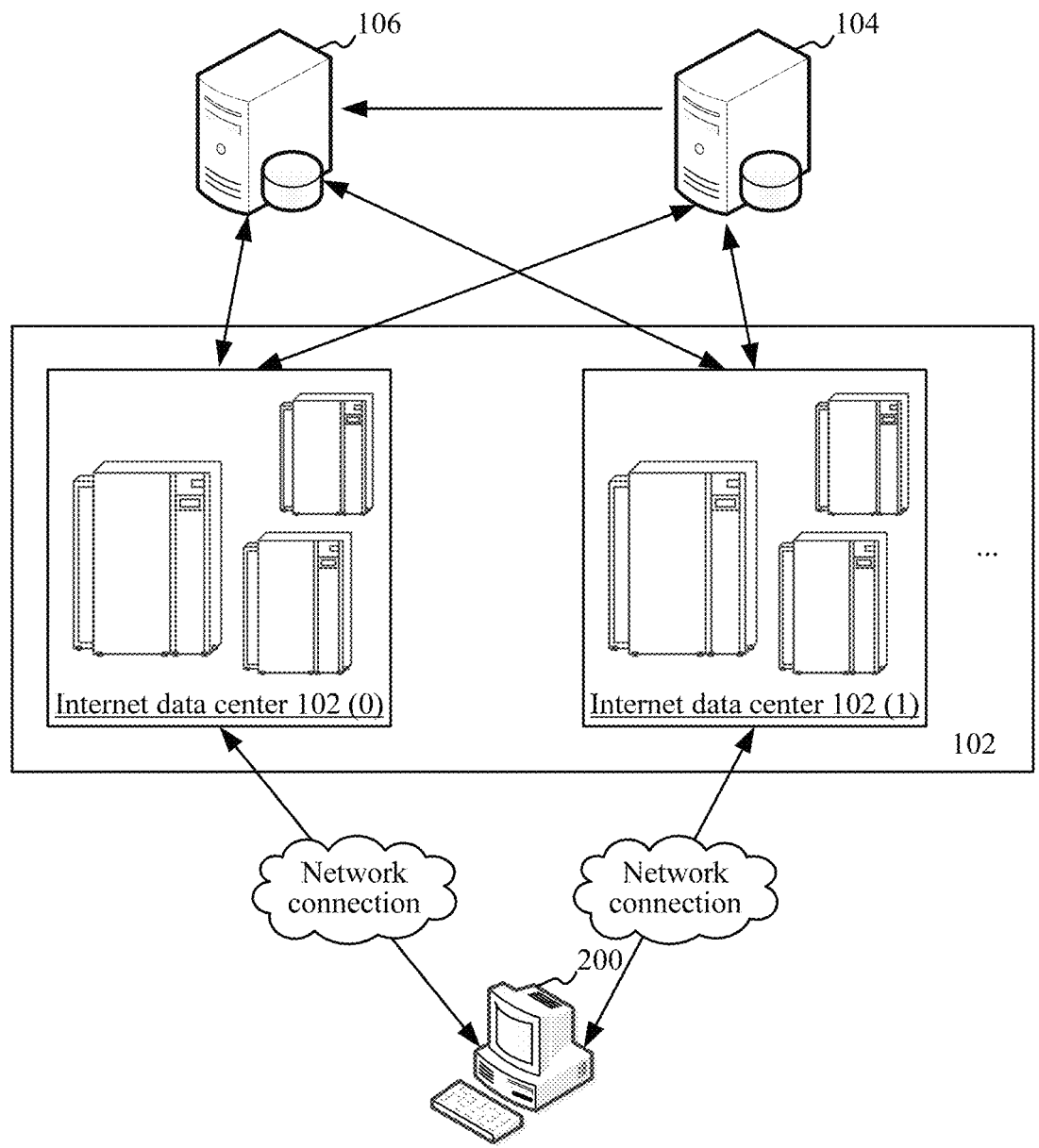
FIG. 2 is a diagram of an application environment of a social networking relationships processing system in another embodiment.

As shown in FIG. 2, in an embodiment, the relation chain processing system further includes a synchronization proxy server 106. The synchronization proxy server 106 is connected to each Internet data center 102, and may be further connected to the relation chain repair server 104.

In an embodiment, the synchronization proxy server 106 is configured to synchronize, when a forward-relationships set and/or a reverse-relationships set of any Internet data center 102 changes, changed relation chain data between the multiple Internet data centers 102.

Specifically, the synchronization proxy server 106 herein is a proxy server, and configured to synchronize relation chain data between the multiple Internet data centers 102 in a proxy manner. When a forward-relationships set and/or a reverse-relationships set of any Internet data center 102 changes, the changed Internet data center 102 sends the changed relation chain data to the synchronization proxy server 106. The synchronization proxy server 106 is configured to synchronize the changed relation chain data to other Internet data centers 102. Core data between the multiple Internet data centers 102 may be exchanged also by using the synchronization proxy server 106.

In an embodiment, the synchronization proxy server 106 is configured to synchronize the repaired forward-relationships set and/or reverse-relationships set between the multiple Internet data centers 102.

Specifically, the synchronization proxy server 106 is in connection communication with the relation chain repair server 104, and obtains changed data when the relation chain repair server 104 repairs the relation chain, so as to synchronize the changed data to each Internet data center 102.

In this embodiment, the relation chain processing system includes the synchronization proxy server 106. The synchronization proxy server 106 may ensure that the forward-relationships set and/or the reverse-relationships set stored in each Internet data center 102 may be synchronized to other Internet data centers 102 when the forward-relationships set and/or the reverse-relationships set are/is changed, and ensure the dynamic consistency of the relation chain.

In an embodiment, each Internet data center 102 is further configured to perform an XOR operation on user identifiers in the locally stored forward-relationships set corresponding to the currently-detected user identifier, to obtain a first XOR value; and perform an XOR operation on user identifiers in the inverted-reverse-relationships set corresponding to the currently-detected user identifier, to obtain a second XOR value.

Specifically, the relation chain repair server 104 may collect relation chain data of each Internet data center 102 to one Internet data center 102, but the data transfer across Internet data centers occupies a large quantity of network bandwidths, and has extremely high consumption on network bandwidth resources and high costs.

To reduce the occupation on network bandwidths, each Internet data center 102 herein is configured to first separately locally perform an XOR operation on the locally stored forward-relationships set corresponding to the currently-detected user identifier, that is, perform an XOR operation on each user identifier in the forward-relationships set, to obtain a first XOR value. Each Internet data center 102 is configured to separately locally perform an XOR operation on the inverted-reverse-relationships set corresponding to the currently-detected user identifier, that is, perform an XOR operation on each user identifier in the inverted-reverse-relationships set, to obtain a second XOR value.

For example, assuming that the forward-relationships set corresponding to the currently-detected user identifier U is represented as f(U):{A, B, C}, the corresponding inverted-reverse-relationships set is represented as rr(U):{A, B, C}. In this way, the first XOR value is XOR(f(U))=A xor B xor C, and the second XOR value is XOR(rr(U))=A xor B xor C, where XOR( ) represents a function for seeking an XOR value, and xor is an XOR operator, where A, B, and C may be binary representation of the user identifiers and the XOR may be performed in binary or any other appropriate digit format. An XOR operation result of two different values is 1; and an XOR operation result of two same values is 0. Therefore, in a normal case, XOR(f(U))=XOR(rr(U)) should exist. If XOR(f(U))≠XOR(rr(U)) exists, it indicates that f(U) is definitely not consistent with rr(U).

The relation chain repair server 104 is specifically configured to obtain the first XOR value and the second XOR value from each Internet data center 102; perform an XOR operation on the first XOR value from each Internet data center 102 to obtain a first comparison value; perform an XOR operation on the second XOR value from each Internet data center 102 to obtain a second comparison value; determine whether the first comparison value is consistent with the second comparison value; and, if the first comparison value is not consistent with the second comparison value, perform consistency repair on the inconsistent forward-relationships set and/or the corresponding reverse-relationships set.

Specifically, assuming that the Internet data centers 102 are numbered by using 0, 1, 2 . . . , a forward-relationships set corresponding to a currently-detected user identifier on a corresponding Internet data center 102 may be represented as fi(U), and a inverted-reverse-relationships set corresponding to a currently-detected user identifier on a corresponding Internet data center 102 may be represented as rri(U), where i=0, 1, 2 . . . , represents numbers of the corresponding Internet data centers 102. The first XOR value from each Internet data center 102 is XOR(fi(U)), an XOR operation is performed on the second XOR value from each Internet data center 102 to obtain a second comparison value XOR(rri(U)).

Therefore, the first comparison value is represented as XOR(f(U))=XOR(f0(U))xor XOR(f1(U))xor XOR(f2(U)) . . . , and the second comparison value is represented as XOR(rr(U))=XOR(rr0(U))xor XOR(rr1(U)) xor XOR(rr2(U)) . . . .

Then, whether the first comparison value XOR(f(U)) is equal to the second comparison value XOR(rr(U)) is determined. If XOR(f(U)) is equal to XOR(rr(U)), it indicates that no consistency problem is detected, and in this case, no repair is performed. If XOR(f(U)) is not equal to XOR(rr(U)), it indicates that a consistency problem is detected, and in this case, consistency repair is performed on the inconsistent forward-relationships set and/or the corresponding reverse-relationships set.

In this embodiment, each Internet data center 102 does not need to collect the locally stored forward-relationships set and reverse-relationships set to perform consistency analysis; instead, only needs to collect the first XOR value and the second XOR value obtained after internal operations are performed to the relation chain repair server 104, and then the relation chain repair server 104 performs subsequent detection. In this way, data that needs to be transmitted across the Internet data centers decreases dramatically, the occupation on the network bandwidths is reduced, resources are saved, and the efficiency is improved.

Figure 3:
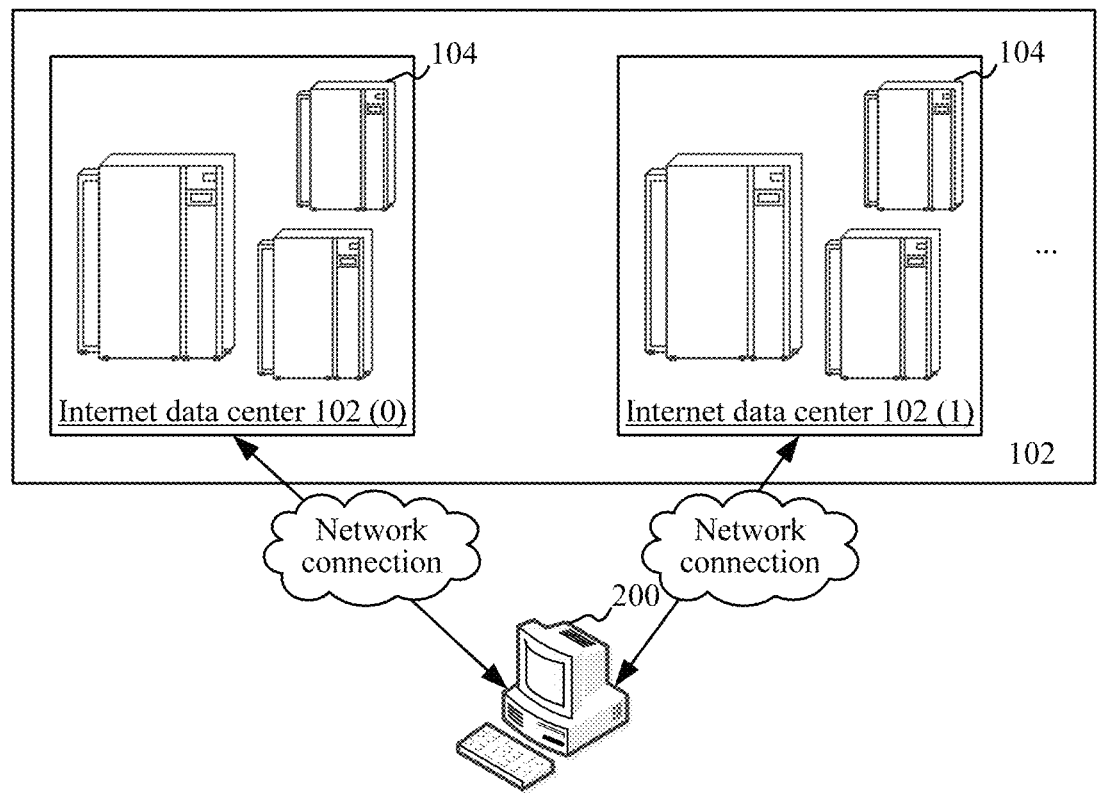
FIG. 3 is a diagram of an application environment of a social networking relationships processing system in another embodiment.

As shown in FIG. 3, in an embodiment, each Internet data center 102 is configured to collect the locally stored forward-relationships set and reverse-relationships set corresponding to the currently-detected user identifier to the relation chain repair server 104 inside the Internet data center 102.

The relation chain repair server 104 inside each Internet data center 102 is configured to calculate the first XOR value between the user identifiers in the forward-relationships set collected in the Internet data center 102, and calculate the second XOR value between the user identifiers in the inverted-reverse-relationships set collected in the Internet data center 102.

A relation chain repair server 104 inside a specified Internet data center 102 is configured to pull the first XOR value and the second XOR value from a relation chain repair server 104 inside another Internet data center 102; perform an XOR operation on the first XOR value from each Internet data center 102 to obtain a first comparison value; perform an XOR operation on the second XOR value from each Internet data center 102 to obtain a second comparison value; determine whether the first comparison value is consistent with the second comparison value; and, if the first comparison value is not consistent with the second comparison value, perform consistency repair on the inconsistent forward-relationships set and/or the corresponding reverse-relationships set.

Specifically, in this embodiment, the relation chain repair server 104 is deployed inside each Internet data center 102. In this way, each Internet data center 102 is first configured to obtain a forward-relationships set fi(U) and a inverted-reverse-relationships set rri(U) stored in the Internet data center 102 corresponding to the currently-detected user identifier, and collect the forward-relationships set fi(U) and the inverted-reverse-relationships set rri(U) in the relation chain repair server 104 inside the Internet data center 102, where i represents a number of a corresponding Internet data center 102.

Then, the relation chain repair server 104 inside each Internet data center 102 is configured to perform an XOR operation on the collected forward-relationships set fi(U) to obtain a first XOR value XOR(fi(U)), and perform an XOR operation on the collected inverted-reverse-relationships set rri(U) to obtain a second XOR value XOR(rri(U)).

Moreover, a relation chain repair server 104 inside one specified Internet data center 102 of the Internet data centers 102 is configured to pull the first XOR value XOR(fi(U)) and the second XOR value XOR(rri(U)) from a relation chain repair server 104 inside another Internet data center 102, so as to calculate a first comparison value XOR(f(U))=XOR (f0(U))xor XOR(f1(U))xor XOR(f2(U)) . . . , and a second comparison value XOR(rr(U))=XOR(rr0(U))xor XOR(rr1 (U))xor XOR(rr2(U)) . . . .

The relation chain repair server 104 inside the specified Internet data center 102 is configured to determine whether the first comparison value XOR(f(U)) is equal to the second comparison value XOR(rr(U)). If XOR(f(U)) is equal to XOR(rr(U)), it indicates that no consistency problem is detected, and in this case, no repair is performed. If XOR (f(U)) is not equal to XOR(rr(U)), it indicates that a consistency problem is detected, and in this case, consistency repair is performed on the inconsistent forward-relationships set and/or the corresponding reverse-relationships set.

In an embodiment, the relation chain repair server 104 is specifically configured to: if the first comparison value is not consistent with the second comparison value, pull/obtain from each Internet data center 102, the forward-relationships set and the inverted-reverse-relationships set corresponding to the currently-detected user identifier; compare the pulled forward-relationships set with the pulled inverted-reverse-relationships set, to locate an inconsistent relation chain pair; and pull, for the inconsistent relation chain pair, the forward-relationships set and the reverse-relationships set of the two parties from an Internet data center 102 to which the two parties belongs, to perform consistency repair.

Specifically, when it is detected that the first comparison value is not consistent with the second comparison value, it indicates that a consistency problem is detected, and in this case, the relation chain repair server 104 is configured to pull, from each Internet data center 102, the forward-relationships set and the inverted-reverse-relationships set corresponding to the currently-detected user identifier. In this way, only the forward-relationships set and the inverted-reverse-relationships set that may have a problem are pulled, and the occupation on network bandwidths is still acceptable.

The relation chain repair server 104 is configured to compare the pulled forward-relationships set with the pulled inverted-reverse-relationships set, and may specifically sort the forward-relationships set and the inverted-reverse-relationships set separately and then perform comparison, to find a relation chain pair that has a problem. The relation chain pair is user identifiers of two parties on one relation chain.

For the relation chain pair that has a problem, the forward-relationships set and the reverse-relationships set of the two parties are pulled from the Internet data center 102 to which the two parties belongs, to perform consistency repair. Then, the synchronization proxy server 104 synchronizes the repaired forward-relationships set and reverse-relationships set in each Internet data center 102.

In an embodiment, the relation chain repair server 104 is configured to: pull, regularly and quantitatively from each Internet data center 102, the forward-relationships set and the inverted-reverse-relationships set corresponding to the user identifier that has a consistency problem; compare the pulled forward-relationships set with the pulled inverted-reverse-relationships set, to locate an inconsistent relation chain pair; and pull, for the inconsistent relation chain pair, the forward-relationships set and the reverse-relationships set of the two parties from an Internet data center 102 to which the two parties belongs, to perform consistency repair.

For example, assuming that the proportion of users who have a consistency problem is more than 0.1%, only 0.1% of a relation chain is repaired once every day. In this way, the proportion of users who have a consistency problem after multiple iterations become less, and finally, the amount repaired every day is equal to the amount generated every day, so that a balance is achieved. In this embodiment, by performing consistency repair regularly and quantitatively, occupation balance on the network bandwidths is achieved.

Figure 4:
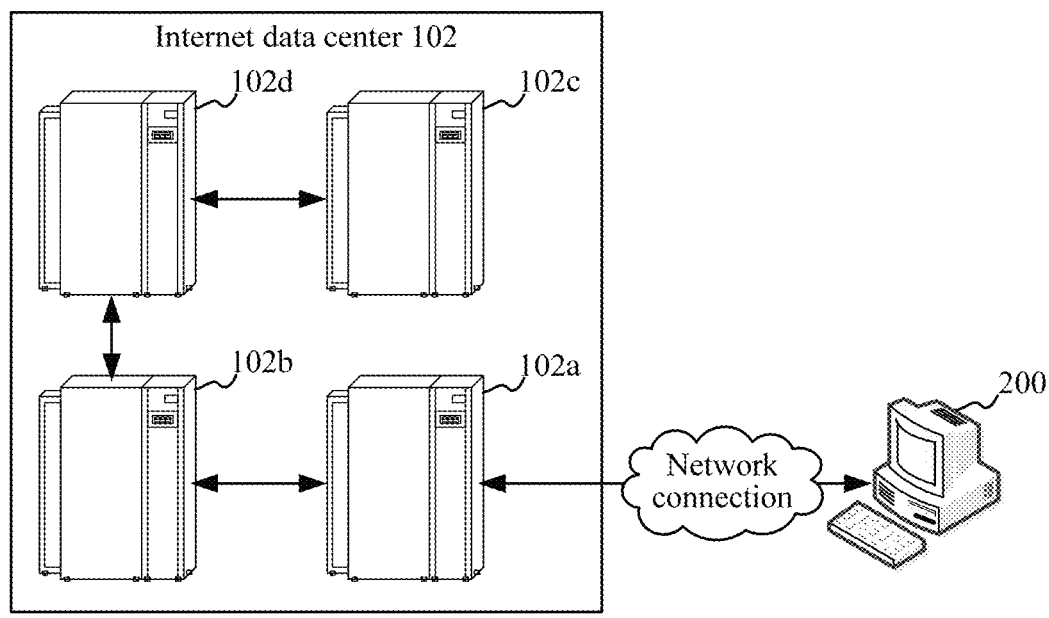
FIG. 4 is a diagram of an application environment of an Internet data center in an embodiment.
Figure 5:
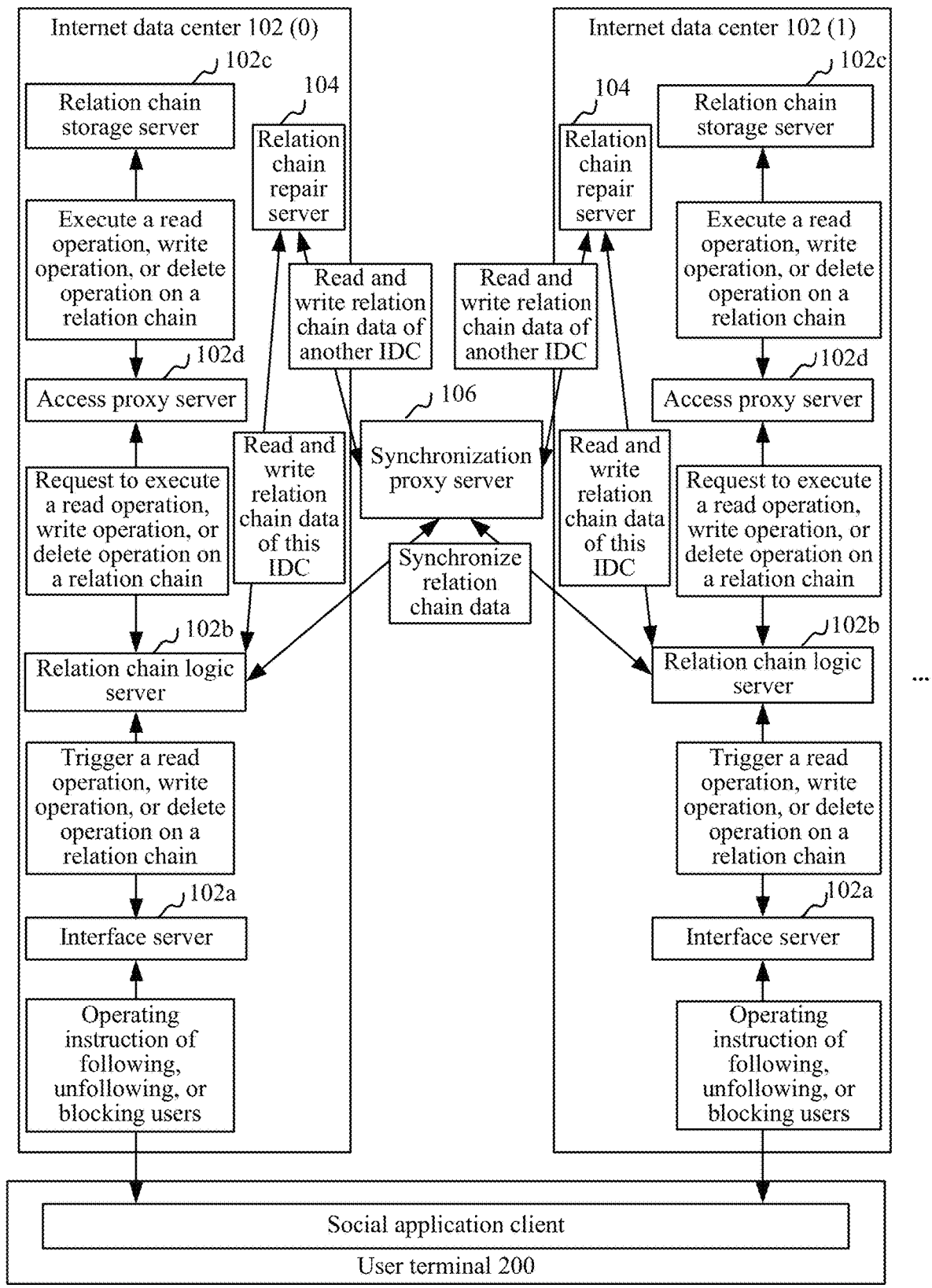
FIG. 5 is a diagram of a social networking relationships processing system in an embodiment.

Referring to FIG. 4 and FIG. 5, in an embodiment, the Internet data center 102 includes an interface server 102a, a relation chain logic server 102b, and a relation chain storage server 102c.

The interface server 102a is configured to connect to a social application client, receive a relationships editing instruction that is corresponding to a user identifier and that is sent by the social application client, and send the relationships editing instruction to the relation chain logic server 102b.

Specifically, the social application client may be an instant messaging application client, a social network site (SNS) application client, or a content share application client. The client may be specially manufactured application software, or may be a third-party application that accesses a corresponding application server. The third-party application is a web page browser, an application with a web page browse function or the like. The social application client may receive and send messages according to a relation chain. The messages herein include at least one of texts, pictures, videos, and audio.

The relationships editing instruction is an instruction for operating a relation chain, and includes operating instructions that relate to changing of the relation chain, such as adding friends, deleting friends, following, unfollowing, adding to a blacklist, and blocking.

The relation chain logic server 102b is configured to access the relation chain storage server 102c according to the relationships editing instruction, to operate a forward-relationships set and/or a reverse-relationships set corresponding to the corresponding user identifier.

Specifically, the relation chain logic server 102b is configured to process various service logics related to the relation chain, and may specifically parse and execute the relationships editing instruction sent by the interface server 102a. The relation chain logic server 102b may be connected to the synchronization proxy server 106, and the synchronization proxy server 106 directly synchronizes changed data of the relation chain between multiple Internet data centers 102. The relation chain logic server 102b may be connected to the relation chain repair server 104, and accept a read operation and/or a write operation of the relation chain repair server 104 for the Internet data center 102.

The relation chain storage server 102b is configured to store the forward-relationships set and the reverse-relationships set corresponding to the user identifier, and accept access and operation of the relation chain logic server 102c for stored forward-relationships set and/or reverse-relationships set.

Specifically, the relation chain storage server 102c may use a distributed key-value storage system, to ensure not missing and reliability of data, and final saving of relation chain data. The relation chain storage server 102c may be further configured to accept various operations of the relation chain logic server 102b, for example, unfollowing, following, and blocking operations.

In this embodiment, inside the Internet data center 102, the interface server 102a uniformly manages access of the Internet data center 102, the relation chain logic server 102b processes various service logics, and the relation chain storage server 102c stores the forward-relationships set and the reverse-relationships set. In this way, server functions inside the Internet data center 102 are clear, and are easy to manage and maintain.

Referring to FIG. 4 and FIG. 5, in an embodiment, the Internet data center 102 further includes an access proxy server 102d.

The relation chain logic server 102b is further configured to access the relation chain storage server by using the access proxy server according to the relationships editing instruction, to operate a forward-relationships set and/or a reverse-relationships set corresponding to the corresponding user identifier.

The access proxy server 102d is configured to control an access frequency and an access permission of the relation chain logic server, and generate an access record.

In this embodiment, the access proxy server 102d isolates the relation chain logic server 102b from the relation chain storage server 102c, and the access proxy server 102d may control the access frequency and the access permission of the relation chain logic server. The generated access record may be used for checking a historical behavior record, and may further be used as a basis of consistency repair. The access proxy server 102d may further play a role of protecting sensitive relation chain data.

In an embodiment, the user identifier may be classified as a public account or a personal user identifier. The user identifiers in the forward-relationships set or the reverse-relationships set are indexed by groups using a specified number of user identifiers as a unit.

The public account is an application account applied for by an application developer or a merchant. By using the public account, the application developer or the merchant may perform one-to-one and one-to-many information interactions, for example, information interactions of texts, pictures, voice, or video, with a user group that follows the public account. The personal user identifier is an application account applied for by an ordinary natural person. When the personal user identifier and the public account have a relation chain, the personal user identifier may be referred to as a fan of the public account. The total number of personal user identifiers that have the relation chain with the public account is generally huge, and the relation chain may be referred to as a long relation chain.

Because of the complexity of the relation chain between the public account and the personal users, the user identifiers in the forward-relationships set or the reverse-relationships set are grouped and indexed, in order to facilitate query of the relation chain data. Grouping using a specified number as a unit refers to that each group obtained after grouping includes a specified number of user identifiers.

Figure 6:
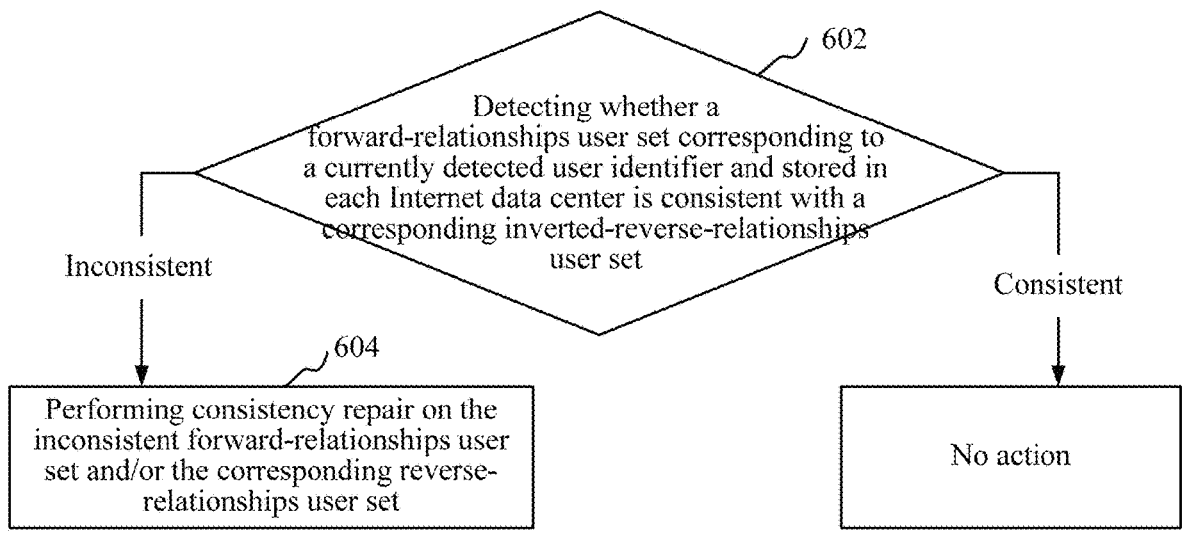
FIG. 6 is a schematic flowchart of a social networking relationships processing method in an embodiment.

As shown in FIG. 6, in an embodiment, a relation chain processing method is provided. This embodiment is described by applying the method to the relation chain processing system in FIG. 1 to FIG. 5. The method specifically includes the followings. A first forward-relationships set corresponding to a user identification of a first user in multiple data centers is accessed. Relationship information of each user in a social network includes a forward-relationships set and a reverse-relationships set, the forward-relationships set including identifications of users added by the corresponding user as contacts, and the reverse-relationships set including identifications of users that added the corresponding user as a contact. An inverted-reverse-relationships set is obtained corresponding to the user identification of the first user, where the inverted-reverse-relationships set includes identifications of users whose reverse-relationships sets contain the user identification of the first user;

Step 602. Detecting whether a forward-relationships set corresponding to a currently-detected user identifier and stored in each Internet data center is consistent with a corresponding inverted-reverse-relationships set. In other words, the method includes determining whether a difference between the first forward-relationships set of the first user and the inverted-reverse-relationship set corresponding to the user identification exists. If the forward-relationships set corresponding to the currently-detected user identifier is not consistent with the corresponding inverted-reverse-relationships set, Step 604 is performed. If the forward-relationships set is consistent with the corresponding inverted-reverse-relationships set, no further action is performed. The forward-relationships set includes user identifiers of social-network friends added by the corresponding currently-detected user identifier; the reverse-relationships set includes user identifiers that add the currently-detected user identifier as a social friend; and the inverted-reverse-relationships set is formed by the user identifiers corresponding to the reverse-relationships sets that include the currently-detected user identifier.

Specifically, the Internet data center is a server cluster, and is a facility that is based on the Internet and provides running maintenance for a device that collects, stores, processes, and sends data in a centralized manner. A server cluster in one Internet data center is centralized geographically. The social friends refer to friends based on a social network, and the friends are not limited to offline friends, and may also be users in various acquaintance relationships, such as colleagues, relatives, or lovers.

A positive relation chain is a relation chain in which a user actively adds another user as a friend, a forward-relationships set is a set of friends added by the user, a user identifier uniquely corresponding to the forward-relationships set is a unique identifier of the user who actively adds a friend, and the user identifiers included in the forward-relationships set are unique identifiers of friends actively added by the user. The forward-relationships set may be stored in a database table, and may be referred to as a positive direction table.

A reverse relation chain is a relation chain in which a user is passively added as a friend by another user, a user identifier uniquely corresponding to a reverse-relationships set is a unique identifier of a user passively added as a friend by another user, and the user identifiers included in the reverse-relationships set are unique identifiers of users who add the user identifier corresponding to the reverse-relationships set as a friend. The reverse-relationships set may be stored in a database table, and may be referred to as a reverse direction table.

The forward-relationships set and the reverse-relationships set corresponding to the user identifier are stored in one Internet data center, and another Internet data center of the multiple Internet data centers stores copies of the forward-relationships set and the reverse-relationships set.

For example, assuming that a user UserA and a user UserB are friends of each other and have no other friend, a forward-relationships set corresponding to the UserA is {UserB}, a reverse-relationships set corresponding to the UserA is {UserB}, and the forward-relationships set and the reverse-relationships set corresponding to the User A are stored in an Internet data center to which the UserA belongs. A forward-relationships set corresponding to the UserB is {UserA}, a reverse-relationships set corresponding to the UserB is {UserA}, and the forward-relationships set and the reverse-relationships set corresponding to the UserB are stored in an Internet data center to which the UserB belongs.

As time passes, the relation chain between the UserA and the UserB may change. For example, if the UserB first deletes the friend UserA, the forward-relationships set corresponding to the UserA is still {UserB}, the reverse-relationships set corresponding to the UserA changes to 0; while the forward-relationships set corresponding to the UserB changes to 0, and the reverse-relationships set corresponding to the UserB is still {UserA}.

Further, when the user UserB deletes the UserA, data in two user sets needs to be operated, that is, the UserA in the forward-relationships set corresponding to the UserB is deleted, and the UserB in the reverse-relationships set corresponding to the UserA is deleted. To operate two user sets simultaneously, modifications need to be performed across Internet data centers. In this case, if during one modification, one user set is modified successfully, and the other user set fails to be modified, relation chains between the Internet data centers are inconsistent, so that the relation chain repair server is needed to maintain the consistency of the relation chains between the multiple Internet data centers.

Step 604. Performing consistency repair on the inconsistent forward-relationships set and/or the corresponding reverse-relationships set. Specifically, first relationship information of the first user and second relationship information of the second user stored in associated data centers are respectively accessed; and at least one of the first forward-relationships set of the first user or a second reverse-relationships set of the second user according to the relationship information of the first user and the second user from the associated data centers is updated, so as to perform the consistency repair.

Specifically, the relation chain repair server detects whether a user relation chain stored in each Internet data center has a consistency problem, and perform consistency repair on the corresponding forward-relationships set and/or reverse-relationships set if the relation chain has a consistency problem. The consistency repair herein is repairing the inconsistent forward-relationships set and the corresponding reverse-relationships set to be consistent, and maintaining the consistency of the multiple Internet data centers. The currently-detected user identifier is a user identifier of a user currently under inconsistency detection as to whether the user's relation chain is inconsistency.

The inverted-reverse-relationships set is formed by all user identifiers corresponding to the reverse-relationships sets that include the currently-detected user identifier as the user adding the respective user identifiers. In this way, in a normal situation, the forward-relationships set corresponding to the currently-detected user identifier is consistent with (e.g., the same as) the corresponding reverse-relationships set. If the forward-relationships set is consistent with the corresponding reverse-relationships set, no repair is performed. If the forward-relationships set corresponding to the currently-detected user identifier is not consistent with the corresponding inverted-reverse-relationships set, it indicates that at least one of the forward-relationships set corresponding to the currently-detected user identifier and the reverse-relationships set has a problem, and consistency repair needs to be performed.

For example, it is assumed that a forward-relationships set corresponding to a currently-detected user identifier U in an Internet data center is represented as f(U):{A, B, C}. From the same Internet data center, other reverse-relationships sets corresponding to other user identifiers and including the currently-detected user identifier U are: r(A):{ . . . , U, . . . }, r(B):{ . . . , U, . . . }, and r(C):{ . . . , U, . . . }, i.e., reverse-relationships sets respectively corresponding to user identifiers A, B, and C. Thus, the inverted-reverse-relationships set includes other user identifiers corresponding to other reverse-relationships sets that include the currently-detected user identifier U include the user identifiers A, B, and C, as rr(U):{A, B, C}, or the inverted-reverse-relationships set corresponding to the currently-detected user identifier. Thus, in a normal situation, f(U)=rr(U). If any relation chain of the currently-detected user identifier is inconsistent, then f(U)≠rr(U) exists.

Further, the relation chain repair server may pull the forward-relationships set corresponding to the currently-detected user identifier in each Internet data center and the corresponding inverted-reverse-relationships set to the relation chain repair server, to further determine whether the forward-relationships set is consistent with the corresponding inverted-reverse-relationships set.

When consistency repair is performed on the inconsistent forward-relationships set and/or the corresponding reverse-relationships set, the inconsistent forward-relationships set may be repaired to be consistent with the corresponding reverse-relationships set; or the reverse-relationships set may be repaired so that the corresponding reverse-relationships set is consistent with the forward-relationships set; or the corresponding forward-relationships set and reverse-relationships set may be modified simultaneously, so that the modified forward-relationships set is consistent with the corresponding reverse-relationships set.

When consistency repair is performed on the inconsistent forward-relationships set and/or the corresponding reverse-relationships set, repair may be performed by maintaining a relation chain as a preferred option. For example, assuming that f(U):{A, B, C}, rr(U):{A, B}, and in this case, f(U)≠rr(U), a user identifier U may be preferably added in a reverse-relationships set corresponding to a user identifier C, so that a relation chain of the user identifier U and the user identifier C can be maintained as much as possible. Certainly, the user identifier C may also be deleted in a forward-relationships set corresponding to the user identifier U, or a forward-relationships set and the corresponding reverse-relationships set may be maintained consistent.

In the relation chain processing method, a relation chain is stored in multiple Internet data centers, so that the availability of the relation chain can still be guaranteed even if one Internet data center is faulty. The relation chain is stored in each Internet data center in forms of a forward-relationships set and a reverse-relationships set, and it may be determined which friends that a user adds and which other users add the user as a friend, so that a bidirectional relation chain between users may be determined, so as to perform a more precise social interaction according to the relation chain. By detecting whether a forward-relationships set of a user is consistent with a inverted-reverse-relationships set, whether a relation chain stored in each Internet data center has a problem can be detected, so as to ensure the consistency and the availability of the relation chain by repairing the forward-relationships set and/or the reverse-relationships set.

In an embodiment, the relation chain processing method further includes: synchronizing, when a forward-relationships set and/or a reverse-relationships set of any Internet data center changes, changed relation chain data between the multiple Internet data centers by using a synchronization proxy server. For example, when an update of the first relationship information of the first user in one of the multiple data centers occurs the synchronization server may synchronize the first relationship information of the first user and relationship information of the second user associated with the update in the multiple data centers. When updating the at least one of the first forward-relationships set of the first user or the second reverse-relationships set of the second user after determining that the difference exists, the second user is the relevant user.

Specifically, the synchronization proxy server herein is a proxy server, and configured to synchronize relation chain data between the multiple Internet data centers in a proxy manner. When a forward-relationships set and/or a reverse-relationships set of any Internet data center changes, the changed Internet data center sends the changed relation chain data to the synchronization proxy server. The synchronization proxy server is configured to synchronize the changed relation chain data to other Internet data centers. Core data between the multiple Internet data centers may be exchanged also by using the synchronization proxy server.

In an embodiment, the relation chain processing method further includes: synchronizing the repaired forward-relationships set and/or reverse-relationships set between the multiple Internet data centers.

Specifically, the synchronization proxy server is in connection communication with the relation chain repair server, and obtains changed data when the relation chain repair server repairs the relation chain, so as to synchronize the changed data to each Internet data center.

In this embodiment, the relation chain processing system includes the synchronization proxy server. The synchronization proxy server may ensure that the forward-relationships set and/or the reverse-relationships set stored in each Internet data center may be synchronized to other Internet data centers when the forward-relationships set and/or the reverse-relationships set are/is changed, and ensure the dynamic consistency of the relation chain.

Figure 7:
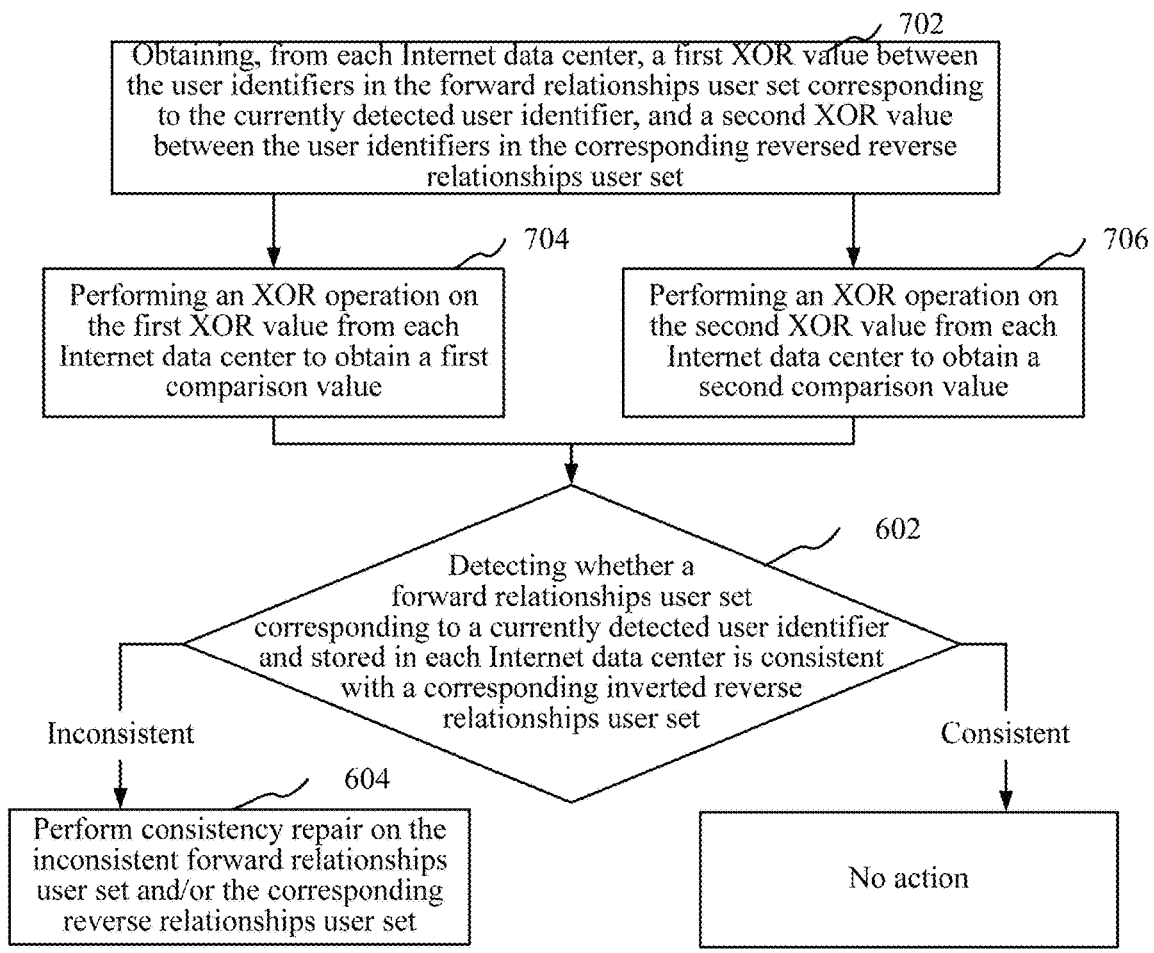
FIG. 7 is a schematic flowchart of detecting whether a forward-relationships set that is corresponding to a currently-detected user identifier and that is stored in each Internet data center is consistent with a corresponding reverse-relationships set in an embodiment.

As shown in FIG. 7, in an embodiment, Step 602 further includes the followings.

Step 702. Obtaining, from each Internet data center, a first XOR value between the user identifiers in the forward-relationships set corresponding to the currently-detected user identifier, and a second XOR value between the user identifiers in the corresponding inverted-reverse-relationships set. In other words, a first XOR value according to user identifications in the first forward-relationships set of the first user, and a second XOR value according to user identifications in the inverted-reverse-relationships set corresponding to the first user are obtained from each data center of the multiple data centers. The first XOR value of each data center may be obtained by performing an XOR operation on the user identifications in the first forward-relationships set of the first user based on relation chain data stored on the data center. The second XOR value of each data center may be obtained by performing an XOR operation on the user identifications in the inverted-reverse-relationships set of the first user based on relation chain data stored on the data center.

Specifically, the relation chain repair server may collect relation chain data of each Internet data center to one Internet data center, but the data transfer across Internet data centers occupies a large quantity of network bandwidths, and has extremely high consumption on network bandwidth resources and high costs.

To reduce the occupation on network bandwidth, each Internet data center herein is configured to first separately locally perform an XOR operation on the locally stored forward-relationships set corresponding to the currently-detected user identifier, that is, perform an XOR operation on each user identifier in the forward-relationships set, to obtain a first XOR value. Each Internet data center is configured to separately locally perform an XOR operation on the inverted-reverse-relationships set corresponding to the currently-detected user identifier, that is, perform an XOR operation on each user identifier in the reverse-relationships set, to obtain a second XOR value.

For example, assuming that the forward-relationships set corresponding to the currently-detected user identifier U is represented as f(U):{A, B, C}, the corresponding inverted-reverse-relationships set is represented as rr(U):{A, B, C}. In this way, the first XOR value is XOR(f(U))=A xor B xor C, and the second XOR value is XOR(rr(U))=A xor B xor C, where XOR( ) represents a function for seeking an XOR value, and xor is an XOR operator. An XOR operation result of two different values is 1; and an XOR operation result of two same values is 0. Therefore, in a normal case, XOR(f(U))=XOR(rr(U)) should exist. If XOR(f(U))≠XOR(rr(U)) exists, it indicates that f(U) is definitely not consistent with rr(U).

Assuming that the Internet data centers are numbered by using 0, 1, 2 . . . , a forward-relationships set corresponding to a currently-detected user identifier on a corresponding Internet data center may be represented as fi(U), and a inverted-reverse-relationships set corresponding to a currently-detected user identifier on a corresponding Internet data center may be represented as rri(U), where i=0, 1, 2 . . . , represents numbers of the corresponding Internet data centers. The first XOR value from each Internet data center is XOR(fi(U)), an XOR operation is performed on the second XOR value from each Internet data center to obtain a second comparison value XOR(rri(U)).

Step 704. Performing an XOR operation on the first XOR value from each Internet data center to obtain a first comparison value. In other words, a first comparison value can be obtained according to the first XOR values from the multiple data centers. Specifically, the first comparison value can be obtained by performing XOR operation on the first XOR values.

Specifically, the first comparison value is represented as XOR(f(U))=XOR(f0(U))xor XOR(f1(U))xor XOR(f2(U)).

Step 706. Performing an XOR operation on the second XOR value from each Internet data center to obtain a second comparison value. In other words, a second comparison value can be obtained according to the second XOR values from the multiple data centers. Specifically, the second comparison value can be obtained by performing XOR operation on the second XOR values.

Specifically, the second comparison value is represented as XOR(rr(U))=XOR(rr0(U))xor XOR(rr1(U))xor XOR(rr2(U)).

Step 708. Determining whether the first comparison value is consistent with the second comparison value. If the first comparison value is not consistent with the second comparison value, Step 604 is performed.

Specifically, whether the first comparison value XOR(f(U)) is equal to the second comparison value XOR(rr(U)) is determined. If XOR(f(U)) is equal to XOR(rr(U)), it indicates that no consistency problem is detected, and in this case, no repair is performed. If XOR(f(U)) is not equal to XOR(rr(U)), it indicates that a consistency problem is detected, and in this case, consistency repair is performed on the inconsistent forward-relationships set and/or the corresponding reverse-relationships set.

In this embodiment, each Internet data center does not need to collect the locally stored forward-relationships set and reverse-relationships set to perform consistency analysis; instead, only needs to collect the first XOR value and the second XOR value obtained after internal operations are performed to the relation chain repair server, and then the relation chain repair server performs subsequent detection. In this way, data that needs to be transmitted across the Internet data centers decreases dramatically, the occupation on the network bandwidths is reduced, resources are saved, and the efficiency is improved.

Figure 8:
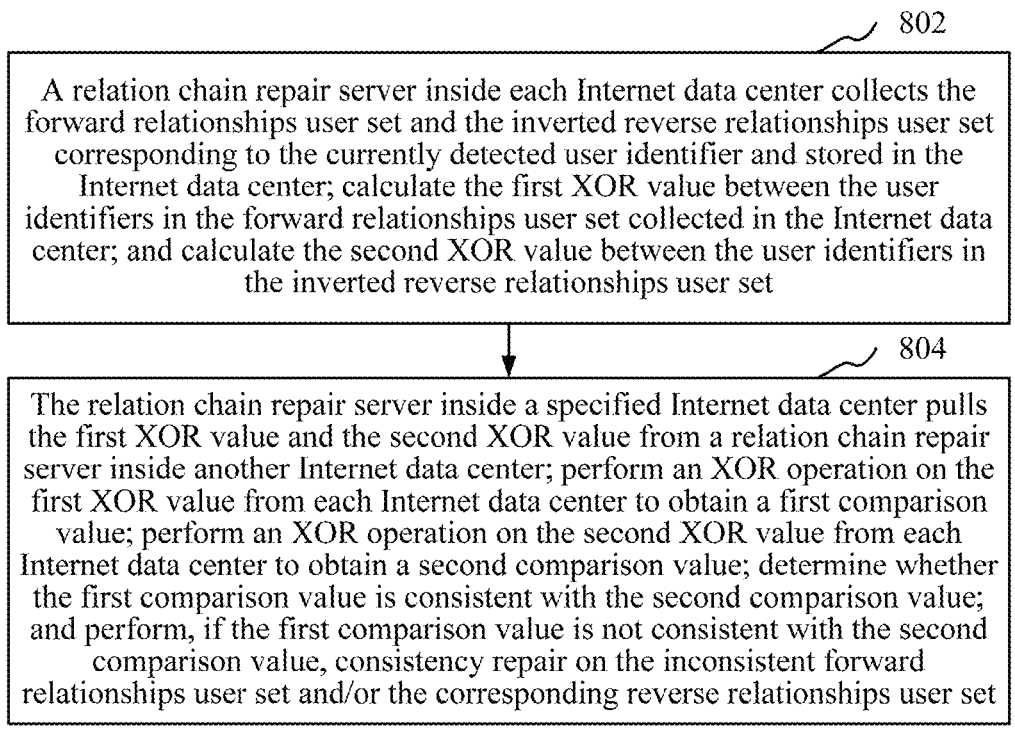
FIG. 8 is a schematic flowchart of obtaining, from each Internet data center, a first XOR value between user identifiers in a forward-relationships set corresponding to a currently-detected user identifier, and a second XOR value between user identifiers in a corresponding reverse-relationships set in an embodiment.

As shown in FIG. 8, in an embodiment, Step 702 (FIG. 7) may further include the followings.

Step 802. A relation chain repair server inside each Internet data center collects the forward-relationships set and the inverted-reverse-relationships set corresponding to the currently-detected user identifier and stored in the Internet data center; calculates the first XOR value between the user identifiers in the forward-relationships set collected in the Internet data center; and calculates the second XOR value between the user identifiers in the inverted-reverse-relationships set collected in the Internet data center.

Specifically, in this embodiment, the relation chain repair server is deployed inside each Internet data center. In this way, each Internet data center is first configured to obtain a forward-relationships set fi(U) and a inverted-reverse-relationships set rri(U) stored in the Internet data center corresponding to the currently-detected user identifier, and to collect the forward-relationships set fi(U) and the inverted-reverse-relationships set rri(U) in the relation chain repair server inside the Internet data center. i represents a number of a corresponding Internet data center.

Then, the relation chain repair server inside each Internet data center is configured to perform an XOR operation on the collected forward-relationships set fi(U) to obtain a first XOR value XOR(fi(U)), and perform an XOR operation on the collected inverted-reverse-relationships set rri(U) to obtain a second XOR value XOR(rri(U)).

Step 804. The relation chain repair server inside a specified Internet data center pulls the first XOR value and the second XOR value from a relation chain repair server inside another Internet data center; performs an XOR operation on the first XOR value from each Internet data center to obtain a first comparison value; perform an XOR operation on the second XOR value from each Internet data center to obtain a second comparison value; determine whether the first comparison value is consistent with the second comparison value; and, if the first comparison value is not consistent with the second comparison value, performs consistency repair on the inconsistent forward-relationships set and/or the corresponding reverse-relationships set.

Specifically, the relation chain repair server inside one specified Internet data center of the Internet data centers is configured to pull the first XOR value XOR(fi(U)) and the second XOR value XOR(rri(U)) from a relation chain repair server inside another Internet data center, so as to calculate a first comparison value XOR(f(U))=XOR(f0(U))xor XOR(f1(U))xor XOR(f2(U)) . . . , and a second comparison value XOR(rr(U))=XOR(rr0(U))xor XOR(rr1(U))xor XOR(rr2(U)) . . . .

The relation chain repair server inside the specified Internet data center is configured to determine whether the first comparison value XOR(f(U)) is equal to the second comparison value XOR(rr(U)). If XOR(f(U)) is equal to XOR(rr(U)), it indicates that no consistency problem is detected, and in this case, no repair is performed. If XOR(f(U)) is not equal to XOR(rr(U)), it indicates that a consistency problem is detected, and in this case, consistency repair is performed on the inconsistent forward-relationships set and/or the corresponding reverse-relationships set.

Figure 9:
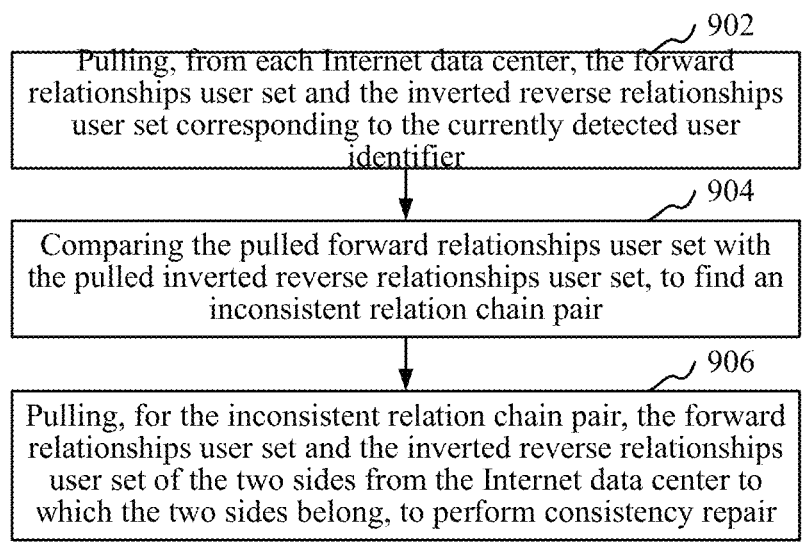
FIG. 9 is schematic flowchart of performing consistency repair on an inconsistent forward-relationships set and/or a corresponding reverse-relationships set in an embodiment.

As shown in FIG. 9, in an embodiment, Step 604 may further includes the followings.

Step 902. Pulling, from each Internet data center, the forward-relationships set and the inverted-reverse-relationships set corresponding to the currently-detected user identifier. In other words, a first relationships server (i.e., the specified relationships server at one data center) may pull the first forward-relationships set of the first user and the corresponding inverted-reverse-relationship set from the multiple data centers when the first comparison value is not consistent with the second comparison value.

Specifically, when it is detected that the first comparison value is not consistent with the second comparison value, it indicates that a consistency problem is detected, and in this case, the relation chain repair server pulls, from each Internet data center, the forward-relationships set and the inverted-reverse-relationships set corresponding to the currently-detected user identifier. In this way, only the forward-relationships set and the inverted-reverse-relationships set that may have a problem are pulled, and the occupation of network bandwidth is still acceptable.

Step 904. Comparing the pulled forward-relationships set with the pulled inverted-reverse-relationships set, to find an inconsistent relation chain pair. For example, the inconsistent relation pair may include the first user and the second user.

Specifically, the relation chain repair server compares the pulled forward-relationships set with the pulled inverted-reverse-relationships set, and may specifically sort the forward-relationships set and the inverted-reverse-relationships set separately and then perform comparison, to find a relation chain pair that has a problem. The relation chain pair is user identifiers of two sides on one relation chain.

Step 906. Pulling, for the inconsistent relation chain pair, the forward-relationships set and the inverted-reverse-relationships set of the two sides from the Internet data center to which the two sides belong, to perform consistency repair. In other words, the first relationship information from a first data center associated with the first user, and the second relationship information of the second user from a second data center associated with the second user, so as to perform consistency repair.

Specifically, for the relation chain pair that has a problem, the forward-relationships set and the inverted-reverse-relationships set of the two sides are pulled from the Internet data center to which the two sides belong, to perform consistency repair. Then, the synchronization proxy server synchronizes the repaired forward-relationships set and inverted-reverse-relationships set in each Internet data center.

In an embodiment, the relation chain processing method further includes: pulling, regularly and quantitatively from each Internet data center, the forward-relationships set and the inverted-reverse-relationships set corresponding to the user identifier that has a consistency problem; comparing the pulled forward-relationships set with the pulled inverted-reverse-relationships set, to find an inconsistent relation chain pair; and pulling, for the inconsistent relation chain pair, the forward-relationships set and the inverted-reverse-relationships set of the two parties from the Internet data center to which the two parties belongs, to perform consistency repair.

For example, assuming that the proportion of users who have a consistency problem is more than 0.1%, only 0.1% of a relation chain is repaired once every day. In this way, the proportion of users who have a consistency problem after multiple iterations become less, and finally, the amount repaired every day is equal to the amount generated every day, so that a balance is achieved. In this embodiment, by performing consistency repair regularly and quantitatively, occupation balance on the network bandwidth is achieved.

Figure 10:
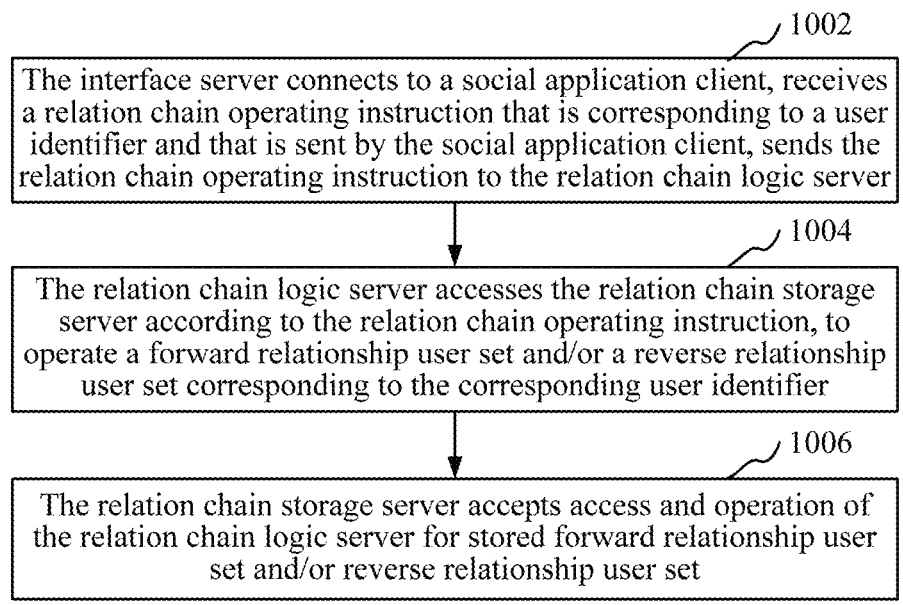
FIG. 10 is a schematic flowchart of running inside an Internet data center in an embodiment.

In an embodiment, the Internet data center includes: an interface server, a relation chain logic server, and a relation chain storage server. As shown in FIG. 10, the relation chain processing method further includes a step of operation inside the Internet data center, and specifically includes the followings.

Step 1002. The interface server connects to a social application client, receives a relationships editing instruction corresponding to a user identifier and sent by the social application client, and sends the relationships editing instruction to the relation chain logic server.

Specifically, the social application client may be an instant messaging application client, an SNS application client, or a content share application client. The client may be specially developed application software, or may be a third-party application that accesses a corresponding application server. The third-party application is a web page browser, an application with a web page browse function, or the like. The social application client may receive and send messages according to a relation chain. The messages herein include at least one of texts, pictures, videos, and audio.

The relationships editing instruction is an instruction for operating a relation chain, and includes operating instructions that relate to changing of the relation chain, such as adding friends, deleting friends, following, unfollowing, adding to a blacklist, and blocking.

Step 1004. The relation chain logic server accesses the relation chain storage server according to the relationships editing instruction, to operate a forward-relationships set and/or a reverse-relationships set corresponding to the corresponding user identifier.

Specifically, the relation chain logic server may process various service logics related to the relation chain, and may specifically parse and execute the relationships editing instruction sent by the interface server. The relation chain logic server may be connected to the synchronization proxy server, and the synchronization proxy server directly synchronizes changed data of the relation chain between multiple Internet data centers. The relation chain logic server may be connected to the relation chain repair server, and accept a read operation and/or a write operation of the relation chain repair server for the Internet data center.

Step 1006. The relation chain storage server accepts access and operation of the relation chain logic server for stored forward-relationships set and/or reverse-relationships set.

Specifically, the relation chain storage server may use a distributed key-value storage system, to ensure not missing and reliability of data, and final saving of relation chain data. The relation chain storage server may be further configured to accept various operations of the relation chain logic server, for example, unfollowing, following, and blocking operations.

In this embodiment, inside the Internet data center, the interface server uniformly manages access of the Internet data center, the relation chain logic server processes various service logics, and the relation chain storage server stores the forward-relationships set and the reverse-relationships set. In this way, server functions inside the Internet data center are clear, and are easy to manage and maintain.

In an embodiment, the Internet data center further includes an access proxy server. The relation chain processing method further includes: accessing, by the relation chain logic server, the relation chain storage server by using the access proxy server according to the relationships editing instruction, to operate a forward-relationships set and/or a reverse-relationships set corresponding to the corresponding user identifier, so that the access proxy server controls an access frequency and an access permission of the relation chain logic server, and generates an access record.

In this embodiment, the access proxy server isolates the relation chain logic server from the relation chain storage server, and the access proxy server may control the access frequency and the access permission of the relation chain logic server. The generated access record may be used for checking a historical behavior record, and may further be used as a basis of consistency repair. The access proxy server may further play a role of protecting sensitive relation chain data.

In an embodiment, the user identifier may be classified as a public account or a personal user identifier. The user identifiers in the forward-relationships set or the reverse-relationships set are indexed by groups using a specified number of user identifiers as a unit.

The public account is an application account applied for by an application developer or a merchant. By using the public account, the application developer or the merchant may perform one-to-one and one-to-many information interactions, for example, information interactions of texts, pictures, voice, or video, with a user group that follows the public account. The personal user identifier is an application account applied for by an ordinary natural person.

Because of the complexity of the relation chain between the public account and the personal users, the user identifiers in the forward-relationships set or the reverse-relationships set are grouped and indexed, in order to facilitate query of the relation chain data. Grouping using a specified number as a unit refers to that each group obtained after grouping includes a specified number of user identifiers.

Figure 11:
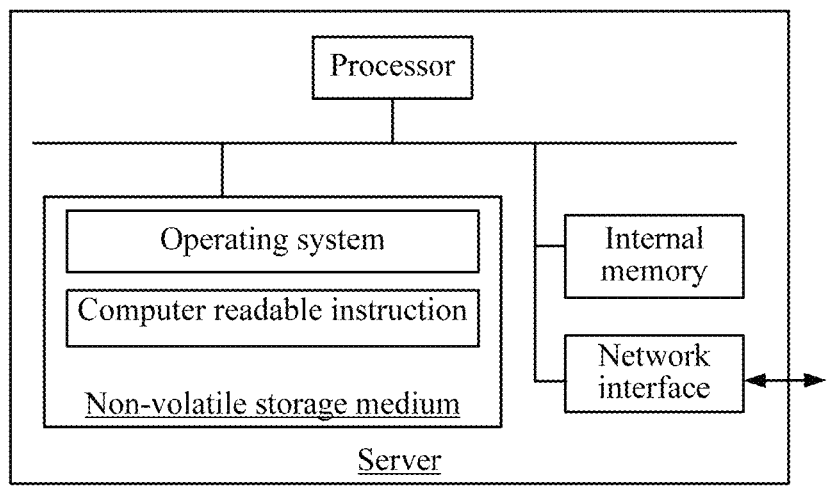
FIG. 11 is a schematic structural diagram of a server in an Internet data center in an embodiment.

As shown in FIG. 11, in an embodiment, the server in the Internet data center includes a processor, a non-volatile storage medium, an internal memory, and a network interface that are connected by using a system bus. The processor has a calculation function and a function of controlling the server to work. The processor is configured to perform a relation chain processing method. The non-volatile storage medium includes at least one of a magnetic storage medium, an optical storage medium, and a flash storage medium. The non-volatile storage medium stores an operating system. The non-volatile storage medium and the internal memory store computer readable instructions, and the computer readable instructions, when executed by the processor, cause the processor to perform a relation chain processing method. The network interface is configured to connect to a network.

Figure 12:
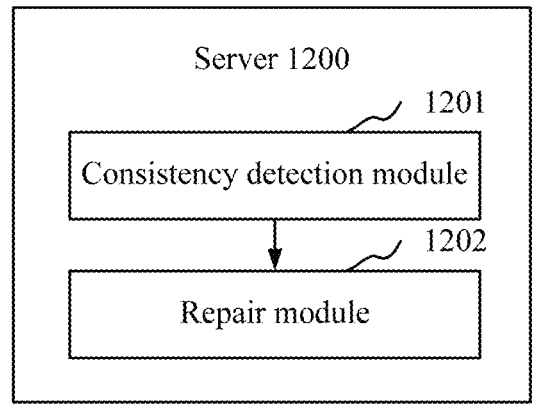
FIG. 12 is a structural block diagram of a server in an embodiment.

As shown in FIG. 12, in an embodiment, a server 1200 is provided. An internal structure of the server 1200 may be corresponding to the structure of the server shown in FIG. 11, and all or some of the following modules may be implemented by software, hardware, or a combination thereof. The server 1200 includes a consistency detection module 1201 and a repair module 1202.

The consistency detection module 1201 is configured to detect whether a forward-relationships set corresponding to a currently-detected user identifier and stored in each Internet data center is consistent with a corresponding inverted-reverse-relationships set, where the forward-relationships set includes user identifiers of social friends added by the corresponding currently-detected user identifier; the reverse-relationships set includes user identifiers that add the currently-detected user identifier as a social friend; and the inverted-reverse-relationships set is formed by the user identifiers corresponding to the reverse-relationships sets that include the currently-detected user identifier.

The repair module 1202 is configured to, if the forward-relationships set corresponding to the currently-detected user identifier is not consistent with the corresponding include the currently-detected user identifier reverse-relationships set, perform consistency repair on the inconsistent forward-relationships set and/or the corresponding reverse-relationships set.

Figure 13:
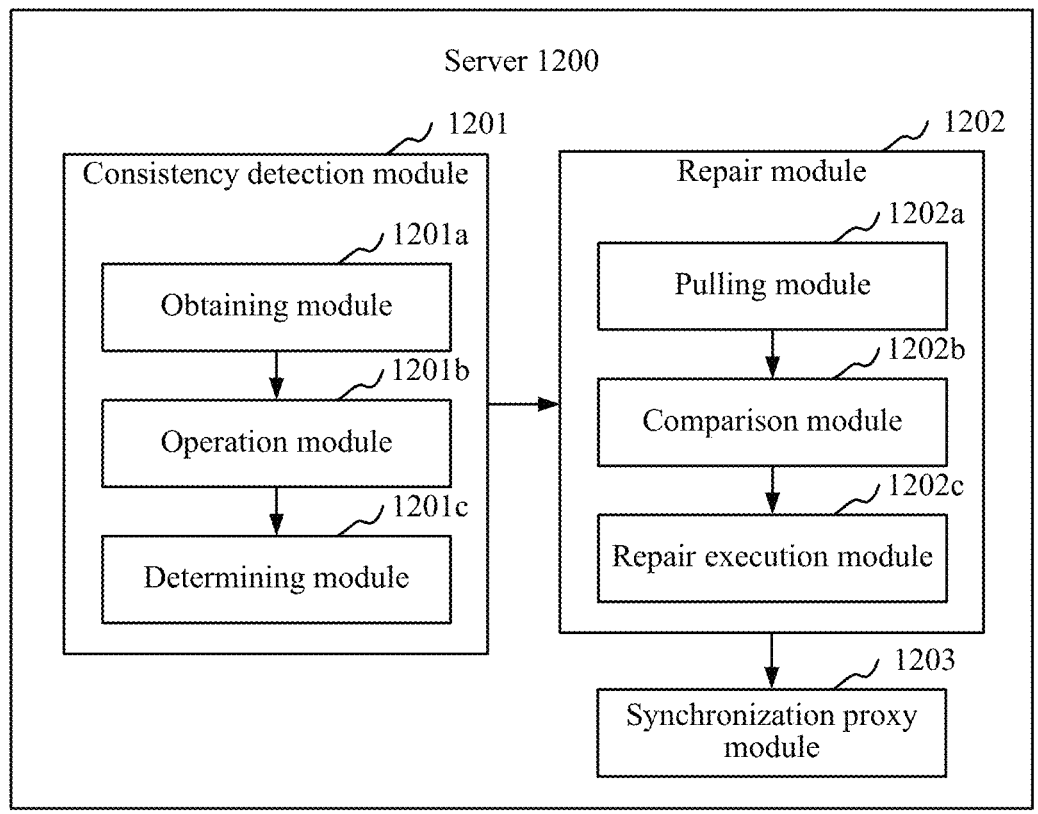
FIG. 13 is a structural block diagram of a server in another embodiment.

As shown in FIG. 13, in an embodiment, the server 1200 further includes a synchronization proxy module 1203, configured to synchronize, when a forward-relationships set and/or a reverse-relationships set of any Internet data center changes, changed relation chain data between the multiple Internet data centers.

In an embodiment, the synchronize proxy module 1203 is further configured to synchronize the repaired forward-relationships set and/or reverse-relationships set between the multiple Internet data centers.

In an embodiment, the consistency detection module 1201 includes: an obtaining module 1201*a*, an operation module 1201*b*, and a determining module 1201*c*.

The obtaining module 1201a is configured to obtain, from each Internet data center, a first XOR value between the user identifiers in the forward-relationships set corresponding to the currently-detected user identifier, and a second XOR value between the user identifiers in the corresponding inverted-reverse-relationships set.

The operation module 1201b is configured to perform an XOR operation on the first XOR value from each Internet data center to obtain a first comparison value; and perform an XOR operation on the second XOR value from each Internet data center to obtain a second comparison value.

The determining module 1201c is configured to determine whether the first comparison value is consistent with the second comparison value.

In an embodiment, the obtaining module 1201a includes: an internal obtaining module running inside each Internet data center.

The internal obtaining module running inside each Internet data center is configured to collect the forward-relationships set and the reverse-relationships set corresponding to the currently-detected user identifier and stored in the Internet data center; calculate the first XOR value between the user identifiers in the forward-relationships set collected in the Internet data center; and calculate the second XOR value between the user identifiers in the inverted-reverse-relationships set collected in the Internet data center.

An internal obtaining module running inside a specified Internet data center is configured to pull the first XOR value and the second XOR value from an internal obtaining module running inside another Internet data center; perform an XOR operation on the first XOR value from each Internet data center to obtain a first comparison value; perform an XOR operation on the second XOR value from each Internet data center to obtain a second comparison value; determine whether the first comparison value is consistent with the second comparison value; and, if the first comparison value is not consistent with the second comparison value, perform consistency repair on the inconsistent forward-relationships set and/or the corresponding reverse-relationships set.

In an embodiment, the repair module 1202 includes: a pulling module 1202a, a comparison module 1202b, and a repair execution module 1202c.

The pulling module 1202a is configured to, if the first comparison value is not consistent with the second comparison value, pull from each Internet data center, the forward-relationships set and the inverted-reverse-relationships set corresponding to the currently-detected user identifier.

The comparison module 1202b is configured to compare the pulled forward-relationships set with the pulled inverted-reverse-relationships set, to find an inconsistent relation chain pair.

The repair execution module 1202c is configured to pull, for the inconsistent relation chain pair, the forward-relationships set and the reverse-relationships set of the two parties from an Internet data center to which the two parties belongs, to perform consistency repair.

In an embodiment, the user identifier may be classified as a public account or a personal user identifier. The user identifiers in the forward-relationships set or the reverse-relationships set are indexed by groups using a specified number of user identifiers as a unit.

In the server 1200, a relation chain is stored in multiple Internet data centers, so that the availability of the relation chain can still be guaranteed even if one Internet data center is faulty. The relation chain is stored in each Internet data center in forms of a forward-relationships set and a reverse-relationships set, and it may be determined which friends that a user adds and which other users add the user as a friend, so that a bidirectional relation chain between users may be determined, so as to perform more precise social interaction according to the relation chain. By detecting whether a forward-relationships set of a user is consistent with a inverted-reverse-relationships set, whether a relation chain stored in each Internet data center has a consistency problem can be detected, so as to ensure the consistency and the availability of the relation chain by repairing the forward-relationships set and/or the reverse-relationships set.

A person of ordinary skill in the art may understand that all or some processes for implementing the foregoing embodiment methods may be completed by a computer program instructing related hardware. The program may be stored in a computer readable storage medium. When the program is running, the processes in the embodiments of the foregoing methods may be included. The storage medium may be a nonvolatile storage medium such as a magnetic disk, an optical disc, a read-only memory (ROM), or a random access memory (Random Access Memory, RAM).

The foregoing technical characteristics of the embodiments may be combined randomly. For ease of description, not all possible combinations of the technical characteristics in the foregoing embodiments are described. However, as long as these combinations of the technical characteristics do not conflict, the combinations shall be considered as the scope recorded in this specification.

The foregoing embodiments only describe several implementations of the present disclosure, and the descriptions are relatively specific and detailed, but cannot be understood as limitation to the patent scope of the present disclosure. It should be noted that a person of ordinary skill in the art may further make variations and improvements without departing from the conception of the present disclosure, and these all fall within the protection scope of the present disclosure. Therefore, the patent protection scope of the present disclosure should be subject to the appended claims.

What is claimed is:

1. A social networking relationships processing method, comprising:

accessing a first forward-relationships set corresponding to a user identification of a first user in multiple data centers, wherein relationship information of each user in a social network includes a forward-relationships set and a reverse-relationships set, the forward-relationships set including identifications of users added by the corresponding user as contacts, and the reverse-relationships set including identifications of users that added the corresponding user as a contact, the forward-relationships set and the reverse-relationships set of the first user are maintained and updated by a first data center of the multiple data centers, and another data center of the multiple data centers stores copies of the forward-relationships set and the reverse-relationships set of the first user;

searching, by a relation chain logic server of a current data center, in reverse-relationships sets of all users locally stored in the current data center, the identification of the first user, to find one or more reverse-relationships sets of one or more users that contain the identification of the first user, and forming an inverted-reverse-relationships set of the first user at the current data center by user identifications of the found one or more users whose reverse-relationships sets contain the identification of the first user;

determining, by a relation chain repair server, whether a difference between the first forward-relationships set of the first user and the inverted-reverse-relationship set corresponding to the user identification exists, comprising:
  obtaining, from the multiple data centers, first Exclusive OR (XOR) values, each first XOR value being separately and locally generated by performing a first XOR operation on user identifications in forward-relationships set of the first user locally-stored at each center;
  obtaining, from the multiple data centers, second XOR values, each second XOR value being separately and locally generated by performing a second XOR operation on user identifications in the inverted-reverse-relationships set corresponding to the first user locally-found at each data center;
  obtaining a first comparison value according to the first XOR values;
  obtaining a second comparison value according to the second XOR values; and
  determining whether the difference between the forward-relationships set and the inverted-reverse-relationships set exists by determining whether the first comparison value is consistent with the second comparison value, such that only the first and second XOR values needs to be transmitted from the multiple data centers to recognize the difference without gathering all data of the forward-relationships set and the reverse-relationships set stored in the multiple data centers to the relation chain repair server, thereby reducing occupation on network bandwidth;
in response to determining that the difference between the forward-relationships set and the inverted-reverse-relationships set exits, identifying, by the relation chain repair server, a second user that causes the difference;
respectively accessing, by the relation chain repair server, first relationship information of the first user and second relationship information of the second user stored in associated data centers; and
updating, by the relation chain repair server, at least one of the first forward-relationships set of the first user or a second reverse-relationships set of the second user according to the relationship information of the first user and the second user from the associated data centers.

2. The method according to claim 1, further comprising:
obtaining, by a relationships server residing in each data center, the first XOR value and the second XOR value locally.

3. The method according to claim 1, further comprising:
when the first comparison value is not consistent with the second comparison value, obtaining, by a first relationships server, the first forward-relationships set of the first user and the corresponding inverted-reverse-relationship set from the multiple data centers;
comparing the obtained first forward-relationships set with the obtained corresponding inverted-reverse-relationship set, to locate an inconsistent relation pair, the inconsistent relation pair including the first user and the second user; and
for the inconsistent relation pair, obtaining the first relationship information from a first data center associated with the first user, and the second relationship information of the second user from a second data center associated with the second user for updating the relationship information.

4. The method according to claim 1, wherein each data center of the multiple data centers comprises an interface server, a relationships logic server, and a relationships storage server; and the method further comprises:
receiving, by the interface server connected with a social application client, a relationships editing instruction corresponding to a third user identification from the social application client; and
forwarding the relationships editing instruction to the relationships logic server;
accessing, by the relationships logic server, the forward-relationships set and the reverse-relationships set corresponding to the third user identification on the relationships storage server; and
based on the relationships editing instruction, updating, by the relationships logic server, the forward-relationships set and the reverse-relationships set corresponding to the third user identification on the relationships storage server.

5. The method according to claim 1, wherein types of a user identification comprise a public account user identification and a personal user identification; and the user identification in a forward-relationships set or the reverse-relationships set are indexed by groups using a specified quantity of user identifications as a unit.

6. A social networking relationships processing system, comprising:
multiple data centers, separately configured to
  store relationship information corresponding to each of a plurality of user identifications, wherein the relationship information of each user in a social network includes a forward-relationships set and a reverse-relationships set, the forward-relationships set including identifications of users added by the corresponding user as contacts, and the reverse-relationships set including identifications of users that added the corresponding user as a contact;
  access a first forward-relationships set corresponding to a user identification of a first user, wherein the forward-relationships set and the reverse-relationships set of the first user are maintained and updated by a first data center of the multiple data centers, and another data center of the multiple data centers stores copies of the forward-relationships set and the reverse-relationships set of the first user; and
  search, by a relation chain logic server in the data center, in reverse-relationships sets of all users locally stored in the current data center, the identification of the first user, to find one or more reverse-relationships sets of one or more users that contain the identification of the first user, and forming an inverted-reverse relationships set of the first user at the current data center by user identifications of the found one or more users whose reverse-relationships sets contain the identification of the first user; and
a relation chain repair server, configured to
  determine whether a difference between the first forward-relationships set of the first user and the inverted-reverse-relationship set corresponding to the user identification exists, comprising:
    obtaining, from the multiple data centers, first Exclusive OR (XOR) values, each first XOR value being separately and locally generated by performing a first XOR operation on user identifications in forward-relationships set of the first user locally-stored at each center;

obtaining, from the multiple data centers, second XOR values, each second XOR value being separately and locally generated by performing a second XOR operation on user identifications in the inverted-reverse-relationships set corresponding to the first user locally-found at each data center;

obtaining a first comparison value according to the first XOR values;

obtaining a second comparison value according to the second XOR values; and determining whether the difference between the forward-relationships set and the inverted-reverse-relationships set exists by determining whether the first comparison value is consistent with the second comparison value, such that only the first and second XOR values needs to be transmitted from the multiple data centers to recognize the difference without gathering all data of the forward-relationships set and the reverse-relationships set stored in the multiple data centers to the relation chain repair server, thereby reducing occupation on network bandwidth;

in response to determining that the difference between the forward-relationships set and the inverted-reverse-relationships set exits, identify a second user that causes the difference;

respectively access first relationship information of the first user and second relationship information of the second user stored in associated data centers; and update at least one of the first forward-relationships set of the first user or a second reverse-relationships set of the second user according to the relationship information of the first user and the second user from the associated data centers.

7. The system according to claim 6, wherein the relation chain repair server is further configured to:

when the first comparison value is not consistent with the second comparison value, obtain the first forward-relationships set of the first user and the corresponding inverted-reverse-relationship set from the multiple data centers;

compare the obtained first forward-relationships set with the obtained corresponding inverted-reverse-relationship set, to locate an inconsistent relation pair, the inconsistent relation pair including the first user and the second user; and for the inconsistent relation pair, obtained the first relationship information from a first data center associated with the first user, and the second relationship information of the second user from a second data center associated with the second user for updating the relationship information.

8. The system according to claim 6, wherein:

each data center comprises an interface server, a relation chain logic server, and a relation chain storage server;

the interface server is configured to connect to a social application client, receive a relationships editing instruction corresponding to a third user identification from the social application client, and send the relationships editing instruction to the relation chain logic server;

the relation chain logic server is configured to access the forward-relationships set and the reverse-relationships set corresponding to the third user identification on the relationships storage server; and update the forward-relationships set and the reverse-relationships set corresponding to the third user identification on the relationships storage server based on the relationships editing instruction; and the relation chain storage server configured to store access and operation of the relation chain logic server for stored forward-relationships sets or reverse-relationships sets.

9. The system according to claim 6, wherein types of a user identification comprise a public account user identification and a personal user identification; and the user identification in a forward-relationships set or the reverse-relationships set are indexed by groups using a specified quantity of user identifications as a unit.

10. A non-transitory computer-readable storage medium containing computer-executable instructions for, when executed by one or more processors, performing a social networking relationships processing method, the method comprising:

accessing a first forward-relationships set corresponding to a user identification of a first user in multiple data centers, wherein relationship information of each user in a social network includes a forward-relationships set and a reverse-relationships set, the forward-relationships set including identifications of users added by the corresponding user as contacts, and the reverse-relationships set including identifications of users that added the corresponding user as a contact, the forward-relationships set and the reverse-relationships set of the first user are maintained and updated by a first data center of the multiple data centers, and another data center of the multiple data centers stores copies of the forward-relationships set and the reverse-relationships set of the first user;

searching, by a relation chain logic server in a current data center, in reverse-relationships sets of all users locally stored in the current data center, the identification of the first user, to find one or more reverse-relationships sets of one or more users that contain the identification of the first user, and forming an inverted-reverse-relationships set of the first user at the current data center by user identifications of the found one or more users whose reverse-relationships sets contain the identification of the first user;

determining, by a relation chain repair server, whether a difference between the first forward-relationships set of the first user and the inverted-reverse-relationship set corresponding to the user identification exists, comprising:

obtaining, from the multiple data centers, first Exclusive OR (XOR) values, each first XOR value being separately and locally generated by performing a first XOR operation on user identifications in forward-relationships set of the first user locally-stored at each center;

obtaining, from the multiple data centers, second XOR values, each second XOR value being separately and locally generated by performing a second XOR operation on user identifications in the inverted-reverse-relationships set corresponding to the first user locally-found at each data center;

obtaining a first comparison value according to the first XOR values;

obtaining a second comparison value according to the second XOR values; and determining whether the difference between the forward-relationships set and the inverted-reverse-relationships set exists by determining whether the first comparison value is consistent with the second comparison value, such that only the first and second XOR values needs to be transmitted from the multiple data centers to recognize the difference without gathering all data of the forward-relationships set and the reverse-relationships set stored in the multiple data centers to the relation chain repair server, thereby reducing occupation on network bandwidth;

in response to determining that the difference between the forward-relationships set and the inverted-reverse-relationships set exits, identifying, by the relation chain repair server, a second user that causes the difference;

respectively accessing, by the relation chain repair server, first relationship information of the first user and second relationship information of the second user stored in associated data centers; and updating, by the relation chain repair server, at least one of the first forward-relationships set of the first user or a second reverse-relationships set of the second user according to the relationship information of the first user and the second user from the associated data centers.

11. The non-transitory computer-readable storage medium according to claim 10, wherein the method further comprises obtaining, by a relationships server residing in each data center, the first XOR value and the second XOR value locally.

12. The non-transitory computer-readable storage medium according to claim 11, wherein the method further comprises:

when the first comparison value is not consistent with the second comparison value, obtaining, by a first relationships server, the first forward-relationships set of the first user and the corresponding inverted-reverse-relationship set from the multiple data centers;

comparing the obtained first forward-relationships set with the obtained corresponding inverted-reverse-relationship set, to locate an inconsistent relation pair, the inconsistent relation pair including the first user and the second user; and for the inconsistent relation pair, obtaining the first relationship information from a first data center associated with the first user, and the second relationship information of the second user from a second data center associated with the second user for updating the relationship information.

13. The non-transitory computer-readable storage medium according to claim 10, wherein each data center of the multiple data centers comprises an interface server, a relationships logic server, and a relationships storage server; and the method further comprises:

receiving, by the interface server connected with a social application client, a relationships editing instruction corresponding to a third user identification from the social application client; and forwarding the relationships editing instruction to the relationships logic server;

accessing, by the relationships logic server, the forward-relationships set and the reverse-relationships set corresponding to the third user identification on the relationships storage server; and based on the relationships editing instruction, updating, by the relationships logic server, the forward-relationships set and the reverse-relationships set corresponding to the third user identification on the relationships storage server.

14. The non-transitory computer-readable storage medium according to claim 10, wherein types of a user identification comprise a public account user identification and a personal user identification; and the user identification in a forward-relationships set or the reverse-relationships set are indexed by groups using a specified quantity of user identifications as a unit.

15. The method according to claim 1, further comprising:

performing a third XOR operation on the first XOR values from the multiple data centers to obtain the first comparison value; and performing a fourth XOR operation on the second XOR values from the multiple data centers to obtain the second comparison value.

16. The system according to claim 6, wherein the relation chain repair server is further configured to:

performing a third XOR operation on the first XOR values from the multiple data centers to obtain the first comparison value; and performing a fourth XOR operation on the second XOR values from the multiple data centers to obtain the second comparison value.

17. The non-transitory computer-readable storage medium according to claim 10, wherein the method further comprises:

performing a third XOR operation on the first XOR values from the multiple data centers to obtain the first comparison value; and performing a fourth XOR operation on the second XOR values from the multiple data centers to obtain the second comparison value.

18. The method according to claim 1, wherein:

the forward-relationships set of the first user is stored in a positive direction database table in the first data center; and the reverse-relationships set of the first user is stored in a reverse direction database table in the first data center.

* * * * *